US010019006B2

(12) United States Patent
Shah et al.

(10) Patent No.: US 10,019,006 B2
(45) Date of Patent: Jul. 10, 2018

(54) SURFACE VEHICLE TRAJECTORY PLANNING SYSTEMS, DEVICES, AND METHODS

(71) Applicant: UNIVERSITY OF MARYLAND, COLLEGE PARK, College Park, MD (US)

(72) Inventors: Brual C. Shah, College Park, MD (US); Petr Svec, Burlington, MA (US); Satyandra K. Gupta, Clarksville, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 15/094,295

(22) Filed: Apr. 8, 2016

(65) Prior Publication Data

US 2016/0299507 A1    Oct. 13, 2016

Related U.S. Application Data

(60) Provisional application No. 62/144,564, filed on Apr. 8, 2015.

(51) Int. Cl.
  *G05D 1/02*  (2006.01)
  *G05D 1/00*  (2006.01)
  (Continued)

(52) U.S. Cl.
  CPC ........... *G05D 1/0206* (2013.01); *B63H 25/00* (2013.01); *G01C 21/203* (2013.01); *G08G 3/02* (2013.01); *B63B 2035/007* (2013.01)

(58) Field of Classification Search
  CPC .. B63B 2035/007; B63H 25/00; G01C 21/00; G05D 1/0206; G08G 3/02
  See application file for complete search history.

(56) References Cited

U.S. PATENT DOCUMENTS

| 6,259,988 B1 * | 7/2001 | Galkowski | G01C 21/00 340/989 |
| 8,849,483 B2 | 9/2014 | Kuwata et al. | |

(Continued)

OTHER PUBLICATIONS

Bautin et al., "Inevitable collision states: a probabilistic perspective," *IEEE International Conference on Robotics and Automation*, May 2010, pp. 4022-4027.

(Continued)

*Primary Examiner* — Khoi H Tran
*Assistant Examiner* — Robert T Nguyen
(74) *Attorney, Agent, or Firm* — Shapiro, Gabor and Rosenberger, PLLC

(57) ABSTRACT

A planning module for a water surface vehicle can determine a vehicle trajectory that avoids one or more moving obstacles, such as civilian marine vessels, by performing a lattice-based heuristic search of a state space for the surface vehicle and selecting control action primitives from a predetermined set of control action primitives based on the search. The planning module can separate a travel space into a plurality of regions and can independently scale the control action primitives in each region based on the moving obstacles therein. The heuristic search includes evaluating a cost function at each state of the state space. The cost function can be based on at least predicted movement of the obstacles responsive to respective maneuvers performed by the surface vehicle at each node of the search.

20 Claims, 8 Drawing Sheets

(51) Int. Cl.
  *B63H 25/00*   (2006.01)
  *G08G 3/02*   (2006.01)
  *G01C 21/20*   (2006.01)
  *B63B 35/00*   (2006.01)

(56) References Cited

U.S. PATENT DOCUMENTS

| | | | | |
|---|---|---|---|---|
| 2013/0030651 A1* | 1/2013 | Moshchuk | ............ | G08G 1/166 701/41 |
| 2013/0151107 A1* | 6/2013 | Nikovski | ............ | B61L 27/0027 701/99 |
| 2017/0168485 A1* | 6/2017 | Berntorp | ................ | G01C 21/26 |
| 2017/0219353 A1* | 8/2017 | Alesiani | ............... | G05D 1/0212 701/533 |

OTHER PUBLICATIONS

Chan et al., "Improved motion planning speed and safety using regions of inevitable collision," *17th CISM-IFToMM Symposium on Robot Design, Dynamics, and Control*, 2008, pp. 103-114.

Colito, J., "Autonomous mission planning and execution for unmanned surface vehicles in compliance with the marine rules of the road," Thesis for Master of Science, University of Washington [online], 2007 [retrieved on Mar. 2, 2018]. Retrieved from the Internet:<URL: http://byron.soe.ucsc.edu/projects/SeaSlug/Documents/Publications/Avoidance/931F3d01.pdf>.

Commandant Instruction M16672.2D, "Navigation Rules, International—Inland," U.S. Department of Transportation, United States Coast Guard, Mar. 1999.

Hart et al., "A formal basis for the heuristic determination of minimum cost paths," *IEEE Transactions of Systems Science and Cybernetics*, Jul. 1968, SSC-4(2): pp. 100-107.

Kuwata et al., "Safe maritime navigation with COLREGs using velocity obstacles," *IEEE/RSJ International Conference on Intelligent Robots and Systems*, Sep. 2011.

Lavalle S.M., Sections 13.1.2, 14.1.2, and 14.2.3 of *Planning Algorithms*, Cambridge University Press, Cambridge, UK, 2006, pp. 722-731, 790-794, and 808-810.

Pivtoraiko et al., "Differentially constrained mobile robot motion planning in state lattices," *Journal of Field Robotics*, 2009, 26(3): pp. 308-333.

Shah et al., "Trajectory planning with adaptive control primitives for autonomous surface vehicles operating in congested civilian traffic," *IEEE/RSJ International Conference on Intelligent Robots and Systems*, Sep. 2014, pp. 2312-2318.

Svec et al., "Adaptive sampling based COLREGSs-compliant obstacle avoidance for autonomous surface vehicles," ICRA Workshop on Persistent Autonomy for Marine Robotics, Hong Kong, China [online], Jun. 2014 [retrieved on Mar. 2, 2018]. Retrieved from the Internet:<URL: http://terpconnect.umd.edu/~akgupta/Publication/ICRA14_PAMR_Svec_draft.pdf >.

Svec et al., "Dynamics-aware target following for an autonomous surface vehicle operating under COLREGs in civilian traffic," *IEEE/RSJ International Conference on Intelligent Robots and Systems*, Nov. 2013, pp. 3871-3878.

Svec et al., "Target following with motion prediction for unmanned surface vehicle operating in cluttered environments," *Autonomous Robots*, 2014, 36: pp. 383-405.

Thrun et al., *Probabilistic Robots*, MIT Press, Cambridge, MA, 2005, pp. 43-64.

* cited by examiner

SURFACE VEHICLE TRAJECTORY PLANNING SYSTEMS, DEVICES, AND METHODS

CROSS-REFERENCE TO RELATED APPLICATIONS

The present application claims the benefit of U.S. Application No. 62/144,564, filed Apr. 8, 2015, which is hereby incorporated by reference herein in its entirety.

STATEMENT REGARDING FEDERALLY SPONSORED RESEARCH

This invention was made with government support under N000141210494 awarded by the Office of Naval Research (ONR). The government has certain rights in the invention.

FIELD

The present disclosure generally relates to surface vehicles, and, more particularly, to trajectory planning and control of an autonomous water surface vehicle operating in congested travel spaces.

BACKGROUND

In recent years, unmanned surface vehicles (USVs) have been increasingly used in many marine applications including ocean sampling, maritime search and rescue, hydrologic surveys, harbor surveillance, and defense. USVs have been also used in assisting autonomous underwater vehicles (AUVs) to explore behaviors of marine species, observe coral reefs, search for natural resources. The growing variety and complexity of research and application oriented tasks require unmanned systems to operate fully autonomously over long time horizons, even in environments with significant moving obstacle traffic, for example, manned, commercial, and recreational vehicles (referred to herein as "civilian vehicles" or "CVs"). The complexity of the environments creates significant challenges for autonomous avoidance of CVs by the USVs. For example, the vessels as well as the unmanned systems have different dynamic characteristics depending on their types and dimensions which in turn affects their braking distance and minimum turning radius.

The International Maritime Organization (IMO) has developed a standardized set of rules called the International Regulations for the Prevention of Collisions at Sea (COLREGS), which serves as a guide for selecting avoidance maneuvers. In order to ensure increased operational safety, it is mandatory for all vessels to comply with these rules throughout their missions. The development of long-term autonomy for USVs requires incorporating COLREGS directly into their behavior-based architectures. While attempts have been made to integrate COLREGS into a path planning algorithm for USVs, these approaches can only operate safely in relatively simple scenarios with less civilian traffic. The approaches also assume that each vessel has the same amount of information about the current COLREGS situation and thus it perceives and reacts in the same way, which may not apply in real-world scenarios where each vessel operator may interpret the COLREGS differently, depending upon perception and estimates of the surrounding vessels among other things.

Referring to FIG. 1, an example harbor scenario is illustrated, where a USV 102 enters the harbor from the south channel 106c with the objective of reaching the west channel 106d. Under ideal conditions, each vessel 104a-104d is assumed to follow COLREGS while avoiding its fellow vessels. As per the scenario described in FIG. 1, CV1 104a is crossing from the right side and the COLREGS "Rule 15" applies (details on specific COLREGS rules can be found on the U.S. Department of Homeland Security, U.S. Coast Guard, Navigation Center website). In this situation, the USV 102 can either yield to CV1 104a (since the vessel 104a has the right of way) by slowing down to a steady state or passing it to the right. Alternatively, the USV 102 can breach the COLREGS by not yielding to CV1 104a and CV3 104c while moving to the west channel 106d.

If the USV 102 chooses the first option, i.e., to slow down and wait for CV1 104a to pass, then it will block the entire south east channel 106c for some time and thus obstruct the way of CV2 104b. Thus, both USV 102 and CV2 104b will have to wait and try to maintain their existing position, all the while trying to avoid collisions with each other and the surrounding land masses. This may not only be inefficient but also risky, since in a dynamic marine environment it may be a challenge to maintain a position of a vessel because of forces due to winds, ocean waves, and wakes generated by other moving vessels.

On the other hand, if the USV 102 breaches the COLREGS with respect to CV1 104a and CV3 104c, the intersection of the south 106c and south east 106b channels becomes free for CV2 104b to pass. The USV 102 will, however, need to evaluate the collision risk with the vessels (e.g., CV4 104d) from the west 106d and north east 106a channels. Although the USV 102 may have the right of way with respect to the vessels 104d from the west channel 106d, the land mass separating the west 106d and south 106c channels may limit visibility so that vessel 104d might not see the USV 102.

As this example illustrates, safe navigation in a highly dense and dynamic environment is a challenging problem. Existing local trajectory planners, which have a limited number of "look-ahead" steps, have been unable to adequately address this problem. While traditional, lattice-based, deliberative planners employ multi-step look-ahead search capability, they require a significant amount of computation to find a global trajectory that optimizes a given performance metric and are thus computationally expensive. As a result, they are unable to achieve the high re-planning rates necessary for safely operating a USV in a congested environment.

Embodiments of the disclosed subject matter may address the above-mentioned problems and limitations, among other things.

SUMMARY

Embodiments of the disclosed subject matter employ a lattice-based 5D trajectory planner for USVs. The planner estimates collision risk and reasons about the availability of contingency maneuvers to counteract unpredictable behaviors of moving obstacles in the travel space, such as manned civilian vessels. The planner also incorporates avoidance behaviors of the vessels into the search for a dynamically feasible trajectory to minimize collision risk. In order to be computationally efficient, it dynamically scales the control action primitives of a trajectory based on the distribution and concentration of moving obstacles in the travel space, while preserving the dynamical feasibility of the primitives.

In one or more embodiments, an operating system can include a planning module configured to determine a trajectory of a surface vehicle. The determined trajectory may avoid one or more moving obstacles in a travel space. The planning module can perform a lattice-based heuristic search of a state space for the surface vehicle and can select control action primitives from a predetermined set of control action primitives for the surface vehicle based on the search. The planning module can partition the travel space into a plurality of regions and can independently scale the control action primitives in each region based on the moving obstacles therein. The heuristic search can include evaluating a cost function at each state of the state space. The cost function can be based on at least predicted movement of the obstacles responsive to respective maneuvers performed by the surface vehicle at each node of the search.

In one or more embodiments, a non-transitory computer-readable storage medium can have a sequence of programmed instructions that a computer processing system of a surface vehicle to perform certain steps. For example, the instructions can cause the computer processing system to separate a travel space for the surface vehicle into a plurality of regions and to independent scale control action primitives in each region based on moving obstacles therein. The instructions can further cause the computer processing system to perform a lattice-based heuristic search of a state space for the surface vehicle in each of the regions and to select a particular control action primitive from a predetermined set of control action primitives based on the heuristic search. The instructions can further cause the computer processing system to iterate the performing and selecting so as to build a determined trajectory for the surface vehicle by concatenating the selected control action primitives. The heuristic search can include evaluating a cost function at each state of the state space, and the cost function can be based on at least predicted movement of the obstacles responsive to respective maneuvers performed by the surface vehicle at each iteration of the search.

In one or more embodiments, a surface vehicle can include at least one actuator and a planning module. The at least one actuator can propel and/or direct the surface vehicle through a travel space. The planning module can determine a trajectory for the surface vehicle that avoids one or more moving obstacles in the travel space. The planning module can perform a lattice-based heuristic search of a state space for the surface vehicle and can select control action primitives from a predetermined set of control action primitives based on the search. The planning module may also separate the travel space into a plurality of regions and can independently scale the control action primitives in each region based on the moving obstacles therein. The heuristic search can include evaluating a cost function at each state of the state space, where the cost function is based on at least predicted movement of the obstacles responsive to the selected control action at each node of the search Objects and advantages of embodiments of the disclosed subject matter will become apparent from the following description when considered in conjunction with the accompanying drawings.

BRIEF DESCRIPTION OF THE DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

DETAILED DESCRIPTION

Figure 1:
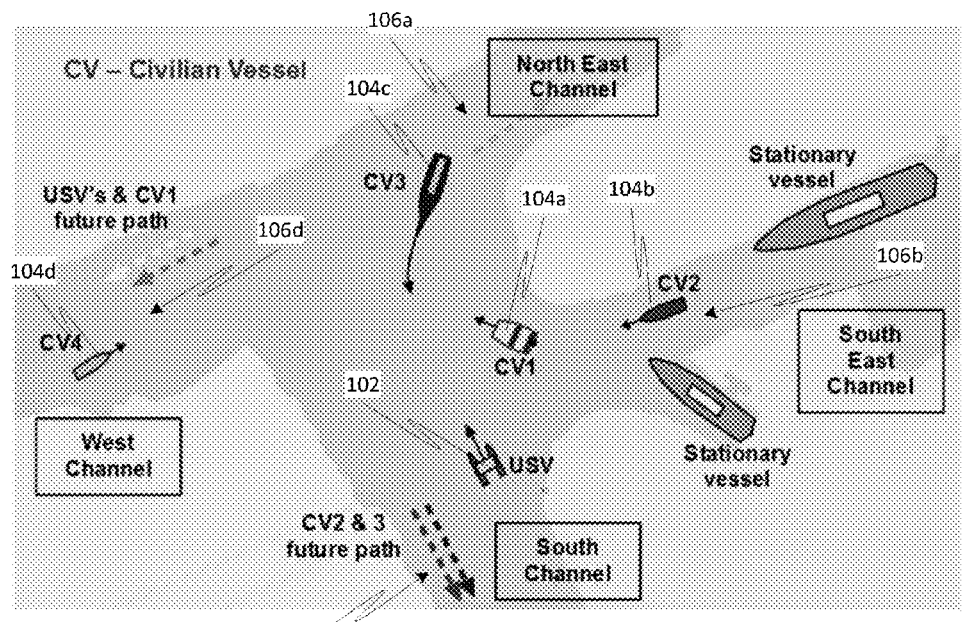
FIG. 1 illustrates a harbor scenario with a surface vehicle navigating through a travel space with multiple moving obstacles.

Presented herein are systems, devices, and methods employing an adaptive, risk and contingency-aware trajectory planning algorithm (A-RCAP), which dynamically scales control action primitives based on estimated spatio-temporal complexity of the local workspace around each state being expanded during the search for a trajectory. This spatio-temporal complexity depends on the distribution and concentration of moving obstacles (e.g., civilian vessels) and their future predicted trajectories. It also depends on the history of spatio-temporal complexity of the states along a trajectory leading to the local workspace. The planning algorithm estimates the complexity of each region around the USV by actively probing the state space during the search. It then dynamically scales the control action primitives while preserving their dynamical feasibility. As explained in further detail below, dividing the workspace into several regions allows the planning algorithm to independently scale the primitives, thereby significantly improving the computational performance of the planner.

The disclosed A-RCAP algorithm integrates a lattice-based, risk and contingency-aware planner (RCAP) that searches for trajectories in a 5D state space and reasons about the collision risk and availability of contingency maneuvers, as discussed in further detail below. In a real-world scenario, it can be difficult to accurately predict the motion of obstacles, especially since that motion may be dependent upon the trajectory pursued by the USV. The RCAP algorithm can model dynamic obstacles as intelligent decision making agents, in particular, by predicting the motion of the obstacle in response to avoidance maneuvers performed by the USV at each node during the search for a trajectory.

Incorporating the knowledge of avoidance behaviors of moving obstacles (e.g., civilian vessels) into trajectory planning allows for the determination of safer trajectories in complex and congested scenes. By integrating contingency maneuvers into a trajectory, the collision rate of the USV can be significantly reduced with the moving obstacles that may breach COLREGS or behave unpredictably in general. Moreover, in congested scenarios, the safety of the USV and/or moving obstacles cannot be guaranteed by following the rules of the COLREGS. Accordingly, the RCAP algorithm incorporates the rules of the COLREGS directly into the cost function, thereby allowing the planner to breach COLREGS as needed to maximize, or at least increase, overall operational safety.

Embodiments of the disclosed subject matter, including systems, methods, and devices employing the disclosed algorithms, can significantly reduce the number of collisions as compared to state-of-the-art local Velocity Obstacles (VO) planners. Moreover, the capability of dynamic scaling of control action primitives during the search for a trajectory yields a significant reduction in the number of states expanded and thus improved computational performance, thereby leading to more frequent replanning cycles over existing computer hardware as compared to existing lattice-based planners. The greater replanning frequency can also provide shorter trajectories with smaller execution times as compared to VO planners.

Figure 2:
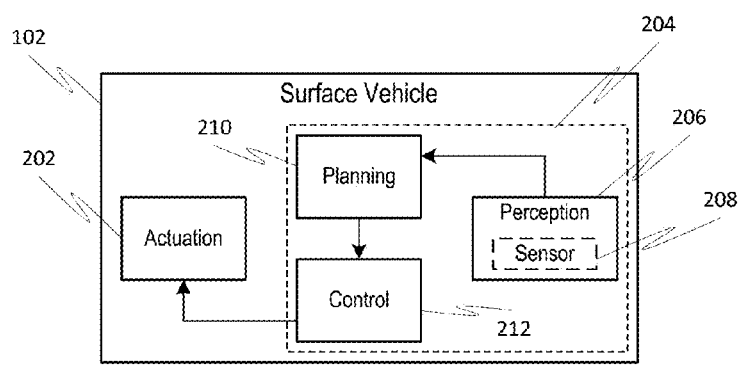
FIG. 2 is a simplified schematic diagram illustrating operational features of a surface vehicle, according to one or more embodiments of the disclosed subject matter.

Referring to FIG. 2, a simplified schematic diagram of a surface vehicle 102 is shown. The surface vehicle 102 can include, among other things, an actuation system 202 and an operating system 204. The actuation system 202 can include one or more components for effecting motion of the surface vehicle 102. For example, the actuation system 202 can include one or more actuators, such as a propeller or other propulsion system, for generating motion of the surface vehicle 102. The actuation system 202 can further include one or more actuators, such as a rudder or other steering component, for directing the surface vehicle 102 along the surface of a marine travel space.

The surface vehicle 102 can include a perception module 206, which includes one or more sensors 208 and/or receives information from one or more separate sensors (not shown). The perception module 206 can use the information from sensors 208 to estimate a state of the surface vehicle 102 as well as stationary and moving obstacles in the travel space. The perception module 206 can output the current state of the surface vehicle 102 and/or states of the obstacles in travel space to the planning module 210.

The planning module 210 can determine a trajectory for the surface vehicle based on the information from the perception module 206 in order to avoid the obstacles in the travel space. In particular, using the current state information, the planning module 210 can perform a lattice-based heuristic search of the state space, including evaluating a cost function at each state of the state space. The cost function is based on at least predicted movement of the obstacles in the travel space as they respond to the selected control action of the surface vehicle 102 at each node of the search. In this manner the planning module 210 can take into account changes in the travel space in determining an optimal trajectory.

The planning module 210 further determines the optimal trajectory by separating the travel space into a plurality of regions, and then independently scaling the control action primitives based on obstacle congestion in each region. The planning module 210 can then select an optimal control action primitive from a predetermined library for each node of the search. In this manner the planning module 210 can determine an optimal trajectory (formed by joining the selected control action primitive at each time step) in a shorter amount of time. Once completed, the planning module 210 can receive new state space information from the perception module 206 and replan the trajectory to take account for any changes in the travel space during the time required to determine the last trajectory.

The planning module 210 can output the determined trajectory to control module 212. Based on the trajectory information, the control module 212 can determine the necessary changes or effects of the actuation system in order to follow the determined trajectory. The control module 212 can then issue appropriate actuator commands to the actuation system 202, taking into account the dynamics and control aspects of the actuation system 202.

As illustrated in FIG. 2, the control module 212, the perception module 206, and the planning module 210 can form the operating system 204. However, it is also possible for one or more modules of the operating system 204 to be embodied as a separate system or omitted. For example, in some embodiments, the perception module 206 may be omitted if the surface vehicle 102 otherwise receives state space information from a sensor system, such as another surface vehicle, a command and control center, or independent sensor systems (such as buoys or other port management sensors).

Figure 3:
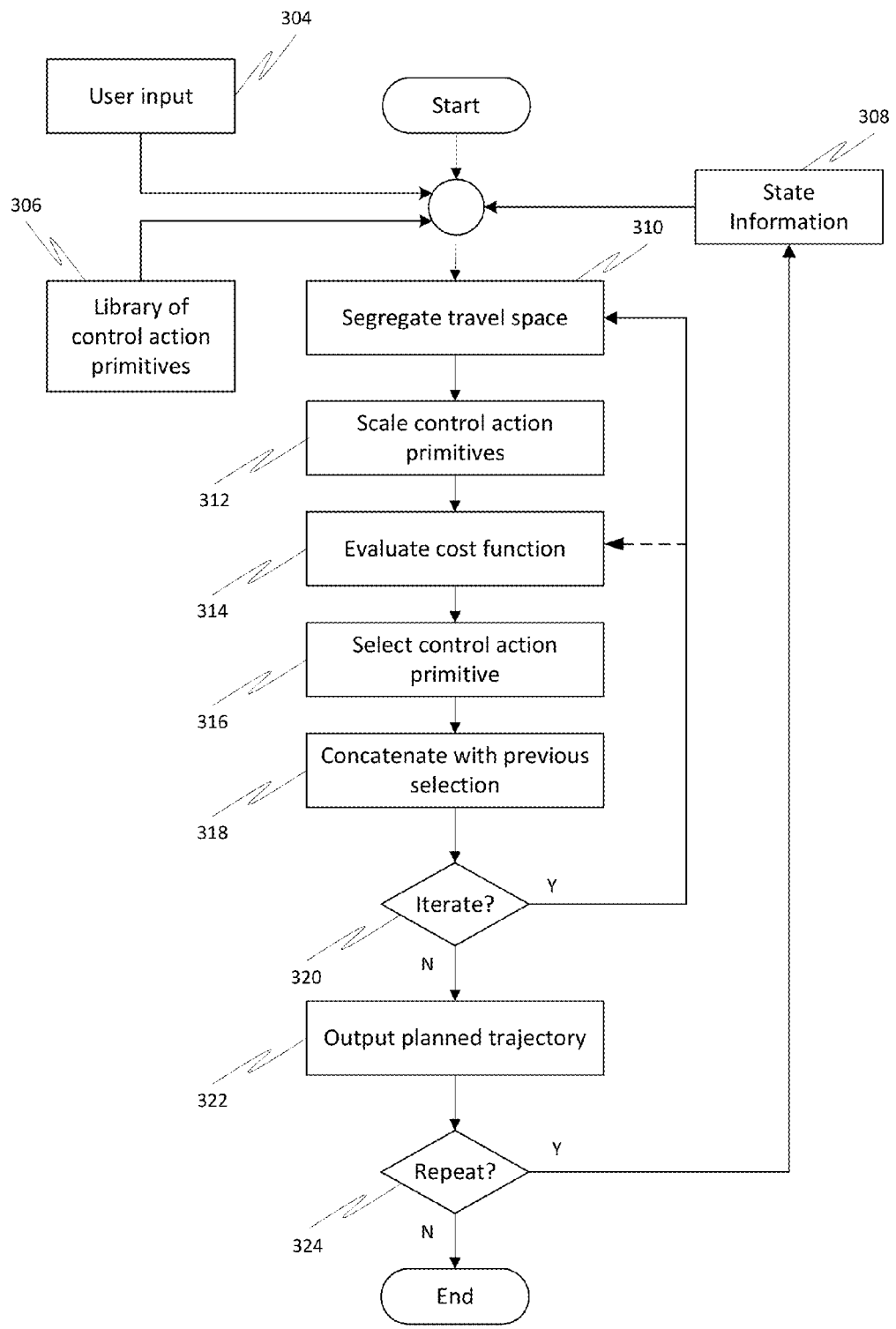
FIG. 3 is a process flow diagram for a method of planning a trajectory for the surface vehicle, according to one or more embodiments of the disclosed subject matter.

Referring to FIG. 3, general aspects of a method for trajectory planning are shown. Additional details regarding the method beyond those explicitly discussed for FIG. 3 can be found in the more detailed discussion following below. In one or more embodiments, the method illustrated in FIG. 3 may be performed by the planning module 210 of the surface vehicle 102 in FIG. 2.

Initially, one or more parameters of the trajectory planning algorithm can be initialized, for example, via input at 304. Such parameters include, but are not limited to, user preference parameters, COLREGS related parameters, computational speed parameters, control action scaling parameters, etc. These parameters can be entered into a computer system performing the trajectory planning, for example, by input via a user interface, such as a graphical user interface, or by direct incorporation into hardware or software of the computer system at the time of manufacture or installation.

The trajectory planning algorithm can further be provided with a library of control action primitives 306 from which to select in determining an optimal trajectory. The library may be based on the dynamical characteristics and mission of the particular surface vehicle. As such, the library may be input with other user initialized information or otherwise provided to the system at 304.

The trajectory planning algorithm further takes into account current state space information of the surface vehicle and obstacles within a travel space of the surface vehicle at 308. The state information may be provided, for example, via perception module 206 of surface vehicle 102 in FIG. 2 and/or via other sensor systems. Using the state information, the trajectory planning algorithm at 310 separates the travel space into separate regions and analyzes the congestion of moving obstacles in each region. Based on the congestion in each region, the trajectory planning algorithm at 312 can independently scale control action primitives in each region to account for the congestion. For example, in regions where the congestion is relatively higher or more dangerous (i.e., more likely to result in a collision), the control action primitives may be scaled back, thereby requiring more iterations to reach a desired goal state. In contrast, in regions where the congestion is relatively lower or less dangerous, the control action primitives may be scaled up, thereby requiring fewer iterations to reach the desired goal state.

After the scaling at 312, the trajectory planning algorithm can evaluate a cost function at each state of the state space. The cost function can be based on at least predicted movement of obstacles in the travel space as they respond to the control action of the surface vehicle. Based on the cost function evaluation, a control action primitive that is best suited for that particular time step and state is selected at 316. If a prior control action primitive was selected in a previous step, then it can be combined with the current selection at 318. Repeating the cycle from 310 to 320 can yield a fully planned trajectory from current state to goal state that is composed of individual control action primitives from each time step coupled together. Optionally, the cycle can be repeated from 314 to 320 to avoid having to re-segregate the travel space and scale control action primitives, which may increase processing speed.

At 322, the trajectory planning algorithm can output the planned trajectory, for example, to control module 212 for use in controlling the surface vehicle 102 in FIG. 2. Once a cycle 310-312 is completed, the trajectory planning algorithm can engage in replanning, for example, to take into account any changes in the travel space that may affect the previously determined trajectory. Thus, at 324, the process can repeat with a reacquisition of state information 308 and searching of the state space (e.g., via steps 310-320) to build a new trajectory. Otherwise, at 324, the process may proceed to termination, for example, if no further obstacles are within the travel space or if the surface vehicle has reached its goal state.

Presented below is a detailed discussion of exemplary algorithms and simulation results that illustrate an application of embodiments of the disclosed subject matter. Although specific details and configurations are discussed, embodiments of the disclosed subject matter are not so limited. Rather, other details and configurations beyond those specified will be apparent to one of ordinary skill in the art and are covered by the present disclosure.

As used herein, $\chi = \chi_\eta \times \chi_\nu \times \mathcal{T}$ is a continuous state space of the USV 102 that has states $x=[\eta^T, v^T, t]^T$. Here, $\eta=[x, y, \psi]^T \in \chi_\eta \subset \mathbb{R}^2 \times \mathbb{S}^1$ is the USV's pose and $v=[u, v, r]^T \in \chi_v \subset \mathbb{R}^3$ is its velocity composed from the surge u, sway v, and angular r speeds about the z-axis in the North-East-Down (NED) coordinate system, and $t \in \mathcal{T}$ is time. A lower dimensional, discrete 5D version of this space is defined as S. Each state $s=[x, y, \psi, u, t]^T \in S$ includes position, orientation, surge speed, and time state variables.

As used herein, $u_c(x_U) \subset \mathbb{R} \times \mathbb{S}^1$ is a continuous, state-dependent, control action space of the USV 102 in which each control action $u_c=[u_d, \psi_d]^T$ includes the desired surge speed $u_d$ and heading $\psi_d$ variables. A discrete version of this set is defined as $u_{c,d}(s_U)$. Each discrete control action in $u_{c,d}(s_U)$ is defined as $u_{c,d}$.

As used herein, $u_e(x_U) \subset u_c(x_U)$ is a set of contingency maneuvers. A discrete version of this subset is defined as $u_{e,d}(s_U)$ which allows the computation requirements to be kept within given bounds. Each discrete control action in $u_{e,d}(s_U)$ is defined as $u_{e,d}$.

As used herein, $\dot{x}_U = f_U(x_U, u_h)$ is a 3 degree of freedom (DOF) dynamic model of the USV. The simulation model of the vehicle includes actuators that produce thrust and moment by taking $u_h$ as the control input, which is determined by the controller $h_U(x_U, u_c, P_U)$, where $P_U$ is the set of its parameters.

As used herein, $B=\{b_l\}_{l=1}^L$ is a set of all the moving obstacles (e.g., civilian vessels), where $b_l$ represents a single moving obstacle and L is the total number of moving obstacles in the travel space. $\chi_{b_l}$ denotes the continuous state space of a moving obstacle $b_l$. The estimated state of $b_l$ is given as $x_{b_l} \in \chi_{b_l}$. The geometric region (e.g., travel space) occupied by all the moving obstacles is defined as $\mathcal{O}_B = \cup_{l=1}^L b(x_{b_l}) \subset \mathbb{R}^2$. Similarly, the geometric region occupied by static obstacles is defined as $\mathcal{O}_S = \cup_{k=1}^K o_{s,k} \subset \mathbb{R}^2$.

As used herein, $$m(x_U, B, \{x_{b_l}\}_{l=1}^L, \{O_l\}_{l=1}^L, O_s)$$

is an intention model that is used to estimate future trajectories of the moving obstacles, where $\{O_l\}_{l=1}^L$ are history states of the moving obstacles.

The continuous state space $\chi$ is discretized into a lower-dimensional 5D state space S. Each state $s=[x, y, \psi, u, t]^T$ includes the position, orientation, surge speed, and time state variables. The continuous control action space $u_c(x)$ is discretized into a discrete control action set $u_{c,d}(s)$ that includes control actions that allow dynamically feasible transitions between adjacent states in S. A discrete control action $u_{c,d}=[u_d, \psi_d]^T \in u_{c,d}(s)$ is defined as a combination of the desired surge speed $u_d$ and heading $\psi_d$ of the USV.

For planning purposes, the discrete control actions are mapped to motion primitives $\{[x, y, \psi, t]^T\}_{i=1}^{L_k}$ of desired poses and arrival times of the USV. A 3 degree of freedom system model of the USV was used to generate the motion primitives. The continuity of a trajectory is retained by selecting the final state of each motion primitive in the center of its respective state space cube.

A discrete contingency control action set can be designed as $u_{e,d}(s) \subset u_c(x_U)$, which includes extreme input values of the surge speed and heading state variables, i.e., $u_{d,min}$, $u_{d,max}$, $-\psi_{d,max}$, $\psi_{d,0}$, $\psi_{d,max}$. This contingency control action primitive set is used to determine the overall safety of the USV's trajectory. In particular, the planner incorporates the collision probability of executing the contingency maneuvers into the evaluation of the overall collision probability of the trajectory, as discussed in further detail below. The contingency maneuvers are a part of the nominal trajectory and can be executed in response to any of the moving obstacles breaching COLREGS.

The designed state-action space enables efficient discrete searching. It captures the USV's differential constraints and thus ensures computation of smooth and dynamically feasible trajectories. A user can define the resolution of the state-action space depending upon the complexity of the scene and the dynamic characteristics of the USV.

Given, (1) a continuous state space $\chi$ of the environment, (2) the initial state $x_{U,I}$ of the USV, (3) the desired final state $x_{U,G}$ of the USV, (4) a 3 degree of freedom dynamic model $f_U$ of the USV, (5) static obstacle regions $\mathcal{O}_S$, (6) estimated states $$\{x_{b_l}\}_{l=1}^{L}$$

of moving obstacles B (e.g., civilian vehicles), (7) the geometric regions $\mathcal{O}_B$ occupied by the USV and moving obstacles, and (8) the intention model m along with a classifier c for predicting future trajectories of the moving obstacles, the task is to compute a collision-free, dynamically feasible trajectory $\tau:[0,T]\to\chi$ such that $\tau(0)=x_{U,I}$, $\tau(T)=x_{U,G}$ and such that its cost is minimized.

Each state $x_U(t)$ along $\tau$ thus belongs to the free state space $\chi_{free}=\chi\setminus\chi_{obs}=\{x_U(t)|U(\eta_U(t))\cap\mathcal{O}(t)=\emptyset\}$ for $t\in[0,T]$, where $\mathcal{O}(t)=\mathcal{O}_S\cup\mathcal{O}_B(t)$ and $U(\eta_U(t))\subseteq\mathbb{R}^2$ is a region occupied by the USV at $\eta_U(t)$. Moving obstacles were assumed to follow COLREGS unless the classifier $c(b_l, O_l)$ reported otherwise. Moreover, it was assumed that the USV uses a Kalman filter to estimate its own state and that the states of moving obstacles are either provided through radio communication or estimated using Kalman-filtered sensor information acquired by the USV. Of course, embodiments of the disclosed subject matter are not limited to the above assumptions, and deviations from the above assumptions are also possible according to one or more contemplated embodiments.

The deliberative risk and contingency-aware trajectory planner (RCAP) searches in a 5D state space to compute a low risk, dynamically feasible trajectory $\tau:[0,T]\to\chi$ from the initial state $x_{U,I}$ to the goal state $x_{U,G}$. The entire trajectory $\tau$ is computed by concatenating action primitives from $u_{c,d}$. The primitives are designed using system identified dynamics model of the USV, and thus guaranteeing the dynamical feasibility of $\tau$. The planner is based on the lattice-based A* heuristic search.

The cost function used during the search for a trajectory $\tau$ is given by $f(s')=g(s')+\in h(s')$, where $g(s')$ is cost-to-come, $h(s')$ is the cost-to-go, and $\in$ is the parameter for balancing the computational speed of the search and the optimality of the trajectory. The expected cost-to-come from the initial state $s_I$ and the current state under evaluation s' is given by:

$$g(s') = g(s) + p_s\left(\frac{c_{g,s'}}{c_{g,max}}\right), \text{and} \quad (1)$$

$$c_{g,s'} = (1 - p_{c,s'}^n)c_{s'} + p_{c,s'}^n((1 - p_{c,s'}^e)c_e + p_{c,s'}^e c_{e,c})$$

where s is the predecessor state and s' is the current state under evaluation. The probability of success to reach the state s from the initial state $s_I$ without any collision over K trajectory segments is given by $p_s=\Pi_{k=1}^{K} 1-p_{c,s_k}$, where $p_{c,s_k}$ is the collision probability of transition between two consecutive states $s_k$ and $s_{k+1}$, described in further detail below. The transition cost between s and s' by using control action $u_{c,d}$ is given by $$c_{s'} = \omega_n\left(\frac{\omega_c t_{s,s'}}{t_{max}} + \frac{(1-\omega_c)d_{s,s'}}{d_{max}}\right) + c_{\neg COLREGS},$$

where $\omega_n$ and $\omega_c$ are user-specified weights, $t_{s,s'}$ is the execution time, $d_{s,s'}$ is the length of the control action, and $c_{\neg COLREGS}$ is the penalty for the state s' being in a COLREGS-breach region, as described in further detail below. The cost of executing emergency contingent action $u_{c,e}$ is given by $c_e$ and the cost of collision during the execution of contingency action is $c_{e,c}$. The user defined cost weights follow the order $c_s<c_e<c_{e,c}$, such that the maximum value which $c_{g,s'}$ can take is equal to $c_{g,max}=c_{e,c}$, when $p_{c,s'}^n=p_{c,s'}^e=1$. The cost-to-go from the current state s' to the final goal state $s_G$ is the weighted sum of the heuristic time estimate and distance required by the USV to reach $s_G$, and is given by $h(s')=\omega_c(t_{s',s_G}/t_{max})+(1-\omega_c)(d_{s',s_G}/d_{max})$.

Evaluation of each state employs calculation of several types of collision probabilities during the search for a trajectory $\tau$:
(i) $p_{c,s'}^n$ is the probability of collision when executing a control action $u_{c,d}$ from s to reach its neighboring state s'. It is calculated by taking a weighted sum of $p_{c,s',U}$ (see (ii) below) and $p_{c,s',B}$ ((see (iii) below), and is given by $p_{c,s'}^n=$ $$p_{c,s'}^n = e^{-\gamma t_{s_I}^s}((1 - \omega_{c,U,B})p_{c,s',U} + \omega_{c,U,B}p_{c,s',B}),$$

$((1-\omega_{c,U,B})p_{c,s',U}+\omega_{c,U,B}p_{c,s',B})$, where $\gamma\geq 0$ is a discount factor and $t_{s_I}$ s is the total traversal time of the USV to arrive at the current state s being expanded from the initial state $s_I$.
(ii) $p_{c,s',U}$ is the probability of collision of the USV with moving obstacles B. $p_{c,s',U,b_l}=\iint_{[x,y]^T\in\mathcal{P}_c} p_{b_l,t}(x,y; \mu_{b_l,t}, \Sigma_{b_l,t})dxdy$ is the probability of collision of the USV with the moving obstacle $b_l$, where $\mathcal{P}=\{[x_{b_l,t}, y_{b_l,t}]^T|b_l(x_{b_l,t}, y_{b_l,t})\cap U(\eta_U^T(t))\neq\emptyset\}$ is the set of all locations at which the moving obstacle $b_l$ may collide with the USV at time t. The geometric regions occupied by the moving obstacle $b_l$ and the USV are given by $U(\eta_U^T(t))$ and $b_l(x_{b_l,t}, y_{b_l,t})$, respectively. Finally, $\mu_{b_l,t}$ and $\Sigma_{b_l,t}$ are the mean and the covariance matrix of the uncertainty in the position of moving obstacle $b_l$ at time t (see further description below). Then, the collision probability with respect to all moving obstacles is given by $p_{c,s',U}=1-\Pi_{l=1}^{L}(1-p_{c,s',U,b_l})$.
(iii) $p_{c,s',B}$ is the probability of collision among the moving obstacles themselves, the computing of which, when the moving obstacles are normally distributed, can be a computationally demanding task. In order to maintain the efficiency of the search, the collision probabilities can be precomputed, for example, computing $p_{c,s',b_i,b_j}$ of the moving obstacles $b_i$ and $b_j$ by sampling their bivariate Gaussian probability densities. More specifically, if the distance between the two sampled positions of the moving obstacles is less than a user-specified distance threshold $d_{c,min}$, then the moving obstacles are considered to collide. The user-specified threshold $d_{c,min}$ can be estimated based on the size and profile of the moving obstacles. The collision probability $p_{c,s',b_i,b_j}$ can then be calculated by taking the ratio of the number of samples that resulted in collision to the total number of samples. The calculated look-up table outputs the probability $p_{c,s',b_i,b_j}$ given the input discrete values of variances $\sigma_{x,i}^2$, $\sigma_{y,i}^2$ (see Equation 2 below) of the Gaussian probability density function of $b_i$, discrete values of variances $\sigma_{x,j}^2$, $\sigma_{y,j}^2$ of the Gaussian probability density function of $b_j$, the relative mean position $x_j$, $y_j$ of $b_j$ with respect to $b_i$, and the relative mean heading $\psi_{b_j}$. The probability of collision is then calculated as $p_{c,s',B} = \max_{b_i \in B, b_j \in B, i \neq j} p_{c,s',i,j}$.

(iv) $p_{c,s'}^e$, is the probability of collision of a contingency control action primitive $u_{c,e}$ when transitioning between the state s to the contingency state s'. It is calculated as $p_{c,s'}^e = \min_{\mathbf{u}_{e,d,i} \in u_{e,d}} p_{c,s',i}^e$, where $u_{e,d}$ is the discrete set of contingency control action primitives, and $p_{c,s',i}^e$ is calculated in the same manner as $p_{c,s',U}$.

Each candidate USV's state s is evaluated for compliance with COLREGS with respect to all moving obstacles during the search for a trajectory. For example, it can be determined whether the USV at the state s is on a collision course with any of the moving obstacles by evaluating through the conditions $d_{CPA} < d_{CPA,min}$ and $t_{CPA} < t_{CPA,max}$. The closest distance between a moving obstacle and the USV when it follows its planned trajectory for a given time horizon is regarded as the closest point of approach (CPA). The computed distance from the current USV's state s to CPA is termed as the distance to CPA, $d_{CPA}$, and the time to reach CPA at planned surge speed is termed as the time to CPA, $t_{CPA}$. The user-specified distance $d_{CPA,min}$ and time $t_{CPA,max}$ thresholds can be selected based on the minimum turning radius, maximum surge speed, and/or acceleration of the USV.

If the above stated primary conditions hold true, the planner of the USV can determine the appropriate rule or rules of the COLREGS that apply, such as, for example, the "head-on" (rule 14), "crossing from right" (rule 15), or "overtaking" (rule 13). If the USV's state s is in a situation where a COLREGS rule may apply, the planner can evaluate the state s for compliance with respect to the appropriate rule. For example, $\eta_U(t)$ and $\eta_U(t_0)$ are the poses of the USV at s and its parent state $s_0$, respectively; t is the actual transition time between the states; $\eta_b(t)$ is the pose of the moving obstacle at time t; $\hat{n}_{U,b} = [n_{U,b,x}, n_{U,b,y}]^T$ is a unit vector in a direction between $\eta_U(t_0)$ and $\eta_b(t)$; and $\hat{n}_{U,t_0,t}$ is a unit vector in a direction between $\eta_U(t_0)$ and $\eta_U(t)$. Then, the state s is COLREGS-compliant with respect to a moving obstacle $b_l$ if $([-n_{U,b,y}, n_{U,b,x}]^T \cdot \hat{n}_{U,t_0,t}) > 0$ (i.e., s is in the right half-plane between $\eta_U(t_0)$ and $\eta_b(t)$).

As discussed above, moving obstacles (e.g., civilian vessels) are considered to be intelligent decision making agents. The planning algorithm thus accounts for reciprocal avoidance maneuvers performed by the moving obstacles. It also considers variations in avoidance maneuvers due to different driving styles and intentions of operators of the moving obstacles. For example, some operators might be more conservative and COLREGS compliant, while others might demonstrate risky, COLREGS-breaching behaviors. The disclosed planner includes an intention motion model that estimates the future trajectories of the moving obstacles given their current and past states, dimensions, estimated goals, and the knowledge of static obstacle regions.

The intention motion model aspect of the planner includes one or more of the following three components:

(i) Classifier $c(b_l, O_l)$: Each moving obstacle $b_l$ is classified as compliant or breaching with respect to the COLREGS based on the observation history of its past states $O_l = \{x_{b_l}(t), x_{b_l}(t-1), \ldots, x_{b_l}(t-\Delta t)\}$.

(ii) Motion prediction model $$m(x_U, B, \{X_{b_l}\}_{l=1}^L, \{O_l\}_{l=1}^L, O_S)$$

The inputs to the model are the current state $x_U$ of the USV, the set of moving obstacles B together with their characteristics (e.g., their dimensions), the current and past states $\{x_{b_l}\}_{l=1}^L$ of the moving obstacles, respectively, and the geometric region $O_S$ occupied by static obstacles. The outputs of the model include, for example, estimated future trajectories $\tau_{b_l}:[0, T_{b_l}] \to \chi_{x,y}$ for each vessel $b_l \in B$, where $\chi_{x,y} \subset \chi$ represents the position subset of the entire state space $\chi$, and $T_{b_l}$ is the time horizon. In embodiments, the prediction model can be assumed to have a priori knowledge of local goals of all the moving obstacles (e.g., by estimating their mission goals based on historical trajectory, via radio communication between the obstacles and other obstacles or the USV, or other means). In addition, the motion prediction model can utilize a classifier $c(b_l; O_l)$ to determine whether a vessel follows COLREGS based on the history of its states. The prediction model for each of the moving obstacles can incorporate the reactive obstacle avoidance component that is used to avoid the USV as well as any other moving obstacle present in the environment.

(iii) Distribution of position uncertainty of a moving obstacle along its predicted trajectory: The uncertainty of a moving obstacle $b_l$ deviating from its estimated trajectory $\tau_{b_l}:[0, T_{b_l}] \to \chi_{x,y}$ using a bivariate normal distribution for different time slices t along the trajectory. The mean of the USV's positions along the trajectory is defined as $\mu_{b_l,t} \in \mathbb{R}^2$. The corresponding covariance matrix that captures the deviations of the vessel from this trajectory at time t is given by $\Sigma_{b_l,t} \in \mathbb{R}^{2 \times 2}$. Initially, the variances of x and y coordinates increase with time as the moving obstacle deviates from its planned trajectory. Later, the variances remain the same or decrease as the moving obstacle approaches its intended goal location. Monte Carlo simulations were performed to estimate $\Sigma_{b_l,t}$ for a scene with a given number of moving obstacles. The deviation of the moving obstacle $b_l$ from a trajectory $\tau_{b_l}$ along the x and y coordinates at discrete time intervals t was recorded, and the trajectory was estimated using the motion prediction model. The covariance matrix $\Sigma_{b_l,t}$ was then calculated with respect to t. A polynomial regression was performed to fit a two degree polynomial $\alpha_\Sigma(t) = \alpha_1 t^2 + \alpha_2 t + \alpha_3$ to the deviation for both of the coordinates. The actual covariance matrix for continuous time t is given by:

$$\sum_{b_l, t} \begin{bmatrix} c & -s \\ s & c \end{bmatrix}^{-1} \begin{bmatrix} \alpha_{\Sigma,x}(t) & 0 \\ 0 & \alpha_{\Sigma,y}(t) \end{bmatrix} \begin{bmatrix} c & -s \\ s & c \end{bmatrix} \qquad (2)$$

where c stands for $\cos(\psi_{b_l})$, s stands for $\sin(\psi_{b_l})$ and $\alpha_{\Sigma,x}(t)$ and $\alpha_{\Sigma,y}(t)$ are variances for the x and y coordinates, respectively.

The RCAP algorithm is based on the lattice-based A* heuristic search. During the search, each state s is evaluated using the cost function described above, which assigns a cost to each state based on the collision risk, compliance with COLREGS, and availability of contingency maneuvers with respect to the moving obstacles. Moreover, the RCAP algorithm considers the reciprocal behaviors of the moving obstacles in the USV's future expanded state s. In particular, the planner employs the motion prediction model $$m(s, B, \{x_{b_l}\}_{l=1}^{L}, \{O_l\}_{l=1}^{L}, O_S)$$

to determine the desired action the moving obstacles B will pursue with respect to the current discrete state of the USV and its control action $u_{c,d} \in u_{c,d}$. The future state of each moving obstacle $b_l \in B$ is determined by forward simulating it for the execution time of $u_{c,d}$. The uncertainty in the state of the moving obstacles is determined by performing a Monte Carlo simulation as described above.

The search for a risk and contingency-aware, dynamically feasible trajectory in a complex 5D state space is computationally expensive, which significantly reduces the replanning frequency. Thus, according to embodiments of the disclosed subject matter, an adaptive risk and contingency-aware planner (A-RCAP) is used. The A-RCAP dynamically scales control action primitives to speed up the search and thus significantly reduce the computational requirements. The algorithm takes advantage of the fact that dense sampling is needed only in regions with a high number of moving obstacles, where it is desirable to use high-fidelity maneuvers to minimize, or at least reduce, the execution time of a trajectory and/or probability of collision. In addition, the A-RCAP planner saves a considerable amount of computational effort by sparsely sampling the regions with low or no congestion. Thus, dynamic adaptation of the execution time of action primitives during the search substantially increases the efficiency of the planner, without sacrificing the quality of a computed trajectory.

The A-RCAP algorithm uses an estimation of spatio-temporal complexity of sub-regions of the surrounding workspace of each expanded state s during the search. The spatio-temporal complexity is determined using the collision probability $p_{c,s',U}$ of each control action primitive $u_{c,d} \in u_{c,d}$ emanating from state s. It also depends on the spatio-temporal complexity of past states along a trajectory leading to state s.

Figure 4A:
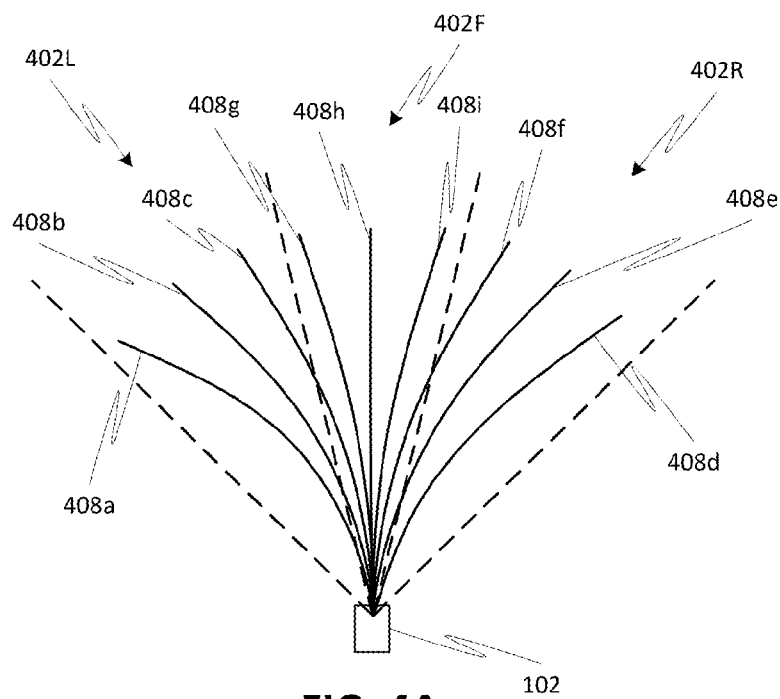
FIG. 4A illustrates an example of a partitioned travel space and corresponding control action primitives in each region of the travel space, according to one or more embodiments of the disclosed subject matter.

The workspace around the current state s can be divided, for example, into a left region 402L, a front region 402F, and a right region 402R, as shown in FIG. 4A. $u_{c,d,l}(s)$ (e.g., primitives 408a-408c), $u_{c,d,f}(s)$ (e.g., primitives 408g-408i), and $u_{c,d,r}(s)$ (e.g., primitives 408e-408f) are the subsets of the set of discrete control action primitives $u_{c,d}(s)$ used by the USV 102. The spatio-temporal complexity for the left region is given by $\lambda_l = \max_{u_{c,d,l} \in u_{c,d,l}} p_{c,s',U}$. The spatio-temporal complexity values $\lambda_f$ and $\lambda_r$ for the front and the right workspace regions, respectively, can be similarly determined. The resulting spatio-temporal complexity values are between 0 and 1, where 0 signifies minimum complexity and 1 signifies maximum complexity. The measure of the spatio-temporal complexity provides an estimation of the risk of collision when executing a control action primitive from the USV's state s in each region.

Figure 4B:
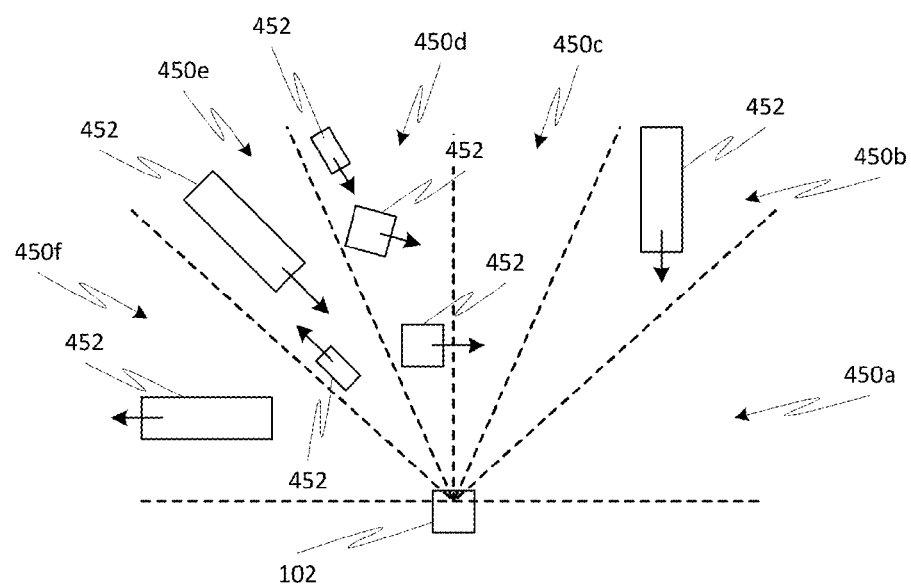
FIG. 4B illustrates an example of a partitioned travel space with varying levels of congestion in the different regions, according to one or more embodiments of the disclosed subject matter.
Figure 4C:
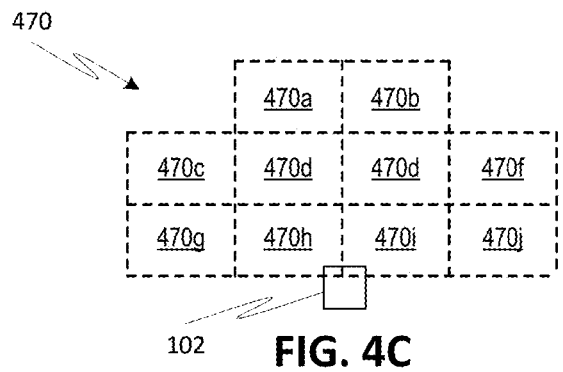
FIG. 4C illustrates another example of a partitioned travel space, according to one or more embodiments of the disclosed subject matter.

Other methodologies for demarcating the travel space into separate regions for control action primitive scaling beyond those illustrated in FIG. 4A are also possible according to one or more contemplated embodiments. For example, instead of dividing the travel space into left, right, and front regions based on polar coordinates, the planner can divide the travel space 470 in a plurality of regions 470a-470j based on rectangular coordinates. Moreover, although FIGS. 4A-4C show the separate regions to be substantially equal to each other in terms of area, embodiments of the disclosed subject matter are not so limited. Indeed, the planner can divide the travel space into unequal areas for control action primitive scaling, for example, based on actual or anticipated congestion, according to one or more contemplated embodiments.

The adaptive sampling of the state space is achieved by time scaling of individual control action primitives in their corresponding subsets $u_{c,d,l}(s)$, $u_{c,d,f}(s)$, and $u_{c,d,r}(s)$. Let $m_l$, $m_f$, $m_r \in M_u$ be the multipliers used for scaling the control action primitives in the left, front, and right region, respectively. The multipliers are computed by Algorithm 2 (see Table 2) using the estimated collision probabilities $\lambda_l$, $\lambda_f$, and $\lambda_r$. The multiplier values of states that are successors of s are computed using the multiplier values of that state.

The partitioning of the workspace into the separate regions (e.g., three regions as shown in FIG. 4A or otherwise) around s allows the planner to independently scale the primitives in their corresponding subsets. In other words, the spatio-temporal complexity of one region will not affect the time scaling of primitives in other regions.

For example, as the algorithm advances the search tree through the state space, the USV 102 might encounter heavy traffic from moving obstacles 452 in regions 450d-450f on its left and almost zero traffic from moving obstacles 452 in regions 450a-450c on its right (see FIG. 4B) in one of the states of the search tree. In such a situation, the algorithm increases the multiplier value $m_r$ of the right region (e.g., region 450a, 450b, and/or 450c) and reduces the multiplier value $m_l$ of the left region (e.g., regions 450d, 450e, and/or 450f). Thus, the control primitives in the right regions will be expanded and those in the left regions will be contracted.

In addition, there may be a situation during the search in which all of the possible action primitives expanded using the scaling multipliers $m_l, m_f, m_r \in M_u$ lead to a collision from a given state s (i.e., $\lambda_l$, $\lambda_f$ and $\lambda_r$ are close to 1). This may occur, for example, when transitioning from states in regions with a low spatio-temporal complexity to states in regions with a high spatio-temporal complexity.

In such circumstances, the algorithm can reconsider the same state s (that is already in the closed set) by adding it to the priority queue (i.e., to the open set) and reduce all scaling multipliers $m_l, m_f, m_r \in M_u$ a predetermined amount, e.g., by half. The state can then be reevaluated using the reduced control action primitives in each region. If the value of all the spatio-temporal complexity parameters ($\lambda_l$, $\lambda_f$, and $\lambda_r$) remains close to 1, then the algorithm may adopt a default minimum value for the multiplier values, e.g., $m_l = m_f = m_r = 1$, and the state reinserted into the priority queue. In Algorithms 1-2 (see FIGS. 12-13), the boolean variable that triggers the reinsertion of the state into the queue is labeled as $r_l$, $r_f$, $r_r \in R$ for left, front and right regions, respectively.

The discrete state transition function used to determine the neighboring states during the search is given by $f_{U,d}(s, u_{c,d}, m_x) = [x + l_u(m_x-1)\cos(\psi_d), y + l_u(m_x-1)\sin(\psi_d), t + (l_u m_x)/u_d]^T$, where $m_x$ can be substituted by $m_l$, $m_f$, or $m_r$. The input of the state transition function are the current state s, the default control action primitive $u_{c,d}$, and one of the scaling multipliers $m_l$, $m_f$, or $m_r$ depending on the subset $u_{c,d,l}$, $u_{c,d,f}$, or $u_{c,d,r}$ to which the control action $u_{c,d}$ belongs. After the execution of $u_{c,d}$ for the time t, the terminal position and orientation of the USV is given by $[x, y]^T$ and $\psi_d$, respectively, and the length of the entire executed trajectory from the initial state of the USV is given by $l_u$. At all times, the scaling multiplier $m_u \geq 1$, so as to ensure that the expanded control action primitives $u'_{c,d}(s)$ are dynamically feasible and executable by the USV's low level controller (e.g., proportional-integral-derivative (PID), backstepping, etc.).

Figure 5:
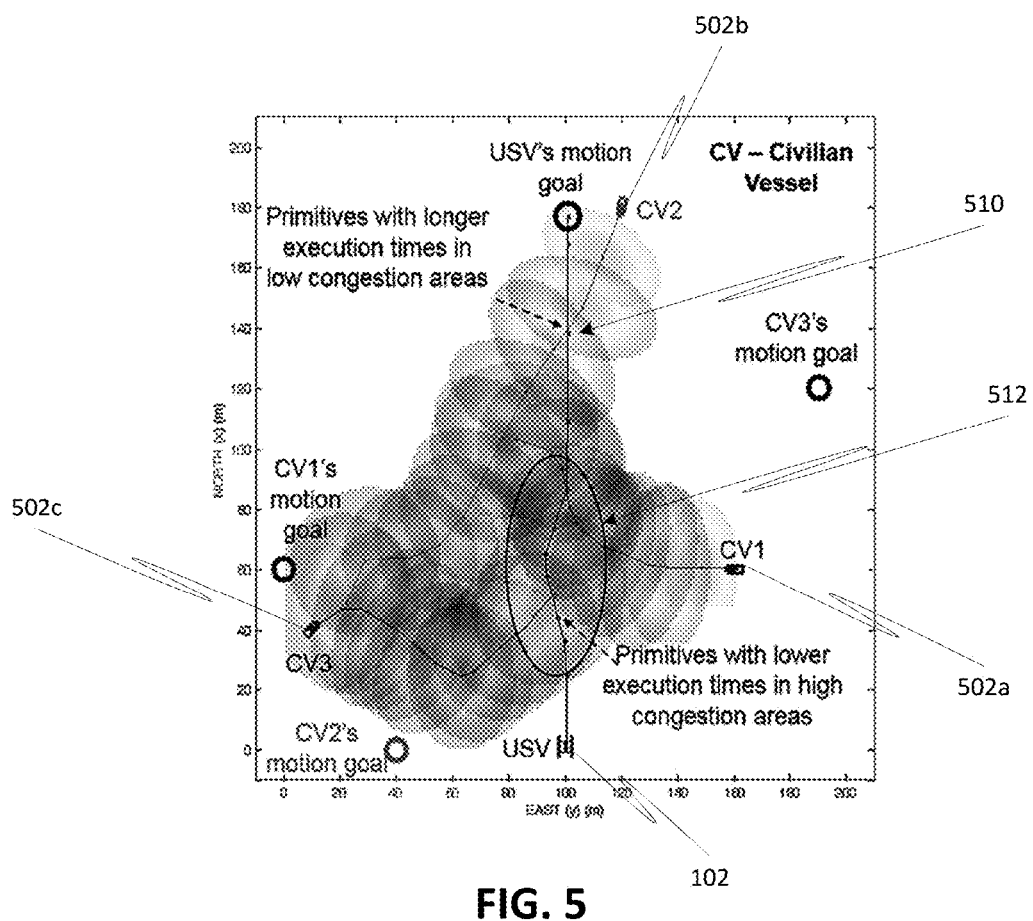
FIG. 5 illustrates an example of trajectory planning in a scenario with three moving obstacles, according to one or more embodiments of the disclosed subject matter.

Referring to FIG. 5, a congested scenario and resulting trajectory for USV 102 computed by the A-RCAP is illustrated. As illustrated in FIG. 5, the USV 102 is attempting to navigate to its motion goal with obstacles 502a-502c operating in the same travel space and moving toward their own motions goals. The intention model described above is used to predict the reciprocal trajectories of all the moving obstacles 502a-502c with respect to the planned trajectory of the USV 102. The uncertainty in an obstacle's predicted position is represented as a sequence of Gaussian distributions (shown as respective clouds around discrete positions along the obstacle's planned trajectory) and increases with time.

The USV's trajectory is comprised of separate control action primitives of varying magnitude and thus execution times. In FIG. 5, the magnitude of control action primitives near the initial location of the USV 102 is high (i.e., lower sampling) and gradually decreases (i.e., higher sampling) as the search progresses towards regions with high congestion (e.g., region 512 from 40 m to 80 m north along the x axis). Conversely, the magnitude of the primitives can increase again when regions of anticipated low congestion are reached along the planned trajectory (e.g., region 510 at a distance of 80 m along the x axis).

In one or more embodiments of the disclosed subject matter, and in the following simulations, the pseudocodes described in Tables 1-2 below are used:

TABLE 1

Algorithm 1 for computing trajectory of USV (e.g., A-RCAP) based on initial state of USV, desired goal, and library of control action primitives

| | |
|---|---|
| Input: | USV's initial state $s_I$, desired goal region $S_G$, and a default, dynamically feasible control action primitive set $u_{c,d}$ |
| Output: | Trajectory τ |
| 1: | Let $S_O \leftarrow \{s_I\}$ be a priority queue of states sorted in ascending order according to the cost function f. |
| 2: | Let $S_C \leftarrow \emptyset$ be the set of all expanded/closed states. |

TABLE 1-continued

Algorithm 1 for computing trajectory of USV (e.g., A-RCAP) based on initial state of USV, desired goal, and library of control action primitives

| | |
|---|---|
| 3: | Let $M = \{m_r, m_f, m_l\} \leftarrow 1$ be the set containing scaling multipliers for the right, front, and left workspace regions. |
| 4: | Let $R = \{r_r, r_f, r_l\} \leftarrow$ false be the sets containing a re-evaluation indicator for the right, front, and left workspace regions. |
| 5: | Let $f_{new}$ be a Boolean function which is used to distinguish newly opened states from states undergoing re-evaluation. |
| 6: | while $S_O$ not empty do |
| 7: | $\quad S_C \leftarrow s \leftarrow S_O.\text{FIRST}()$ |
| 8: | $\quad$ if $s \in S_G$ then |
| 9: | $\quad\quad$ return Trajectory τ generated by recursively tracing the predecessors of s up to $s_I$. |
| 10: | $\quad$ end if |
| 11: | $\quad f_{new}(s) = \neg r_l \wedge \neg r_f \wedge \neg r_r$ |
| 12: | $\quad$ for all $u_{c,d,x} \in \{u_{c,d,l}, u_{c,d,f}, u_{c,d,r}\} \subset u_{c,d}$ do |
| 13: | $\quad\quad$ Let $r_x \in R$ be a re-evaluation indicator corresponding to region x. |
| 14: | $\quad\quad$ if $r_x \vee f_{new}(s)$ then |
| 15: | $\quad\quad\quad$ for all $u_{c,d} \in u_{c,d,x}$ do |
| 16: | $\quad\quad\quad\quad$ Let $m_x \in M$ be a scaling multiplier corresponding to region x. |
| 17: | $\quad\quad\quad\quad$ s' $\leftarrow f_{U,d}(s, u_{c,d}, m_x)$ |
| 18: | $\quad\quad\quad\quad$ if s' $\notin S_C$ then |
| 19: | $\quad\quad\quad\quad\quad$ Estimate current states $\{x_{b_l}(t')\}_{l=1}^{L}$ of all moving obstacles at time t' by forward simulating their respective intention models $\{m_l\}_{l=1}^{|B|}$. |
| 20: | $\quad\quad\quad\quad\quad$ Compute $p_{c,s}^n$, and $p_{c,s}^e$, for the USV moving between s and s'. |
| 21: | $\quad\quad\quad\quad\quad$ if (s' $\notin S_O$) $\vee$ (s' $\in S_O \wedge (f_{new}(s') < f_{old}(s'))$) then |
| 22: | $\quad\quad\quad\quad\quad\quad$ Set s' as the best successor state of s. |
| 23: | $\quad\quad\quad\quad\quad\quad$ Insert/update s' into/in $S_O$. |
| 24: | $\quad\quad\quad\quad\quad$ end if |
| 25: | $\quad\quad\quad\quad$ end if |
| 26: | $\quad\quad\quad$ end for |
| 27: | $\quad\quad\quad$ $\{m_x, r_x\} \leftarrow$ COMPUTESCALINGFACTOR($u_{c,d,x}$, $m_x, r_x$) |
| 28: | $\quad\quad$ end if |
| 29: | $\quad$ end for |
| 30: | $\quad$ if $r_l \vee r_f \vee r_r$ then |
| 31: | $\quad\quad$ Remove s from $S_C$ and insert it into $S_O$. |
| 32: | $\quad$ end if |
| 33: | end while |
| 34: | return τ = ∅ (no suitable trajectory has been found). |

TABLE 2

Algorithm 2 for computing scaling factors for control action primitives

| | |
|---|---|
| Input: | $\mathcal{U}_{c,d,x}$, which is a set of control action primitives in region x, the control action primitive scaling multiplier $m_x$, and the re-evaluation boolean indicator $r_x$ for region x. The region x can be one of the demarcated regions of the travel space, e.g., the left, right, or front region of FIG. 4A. |
| Output: | A new control action primitive scaling factor $m_x'$ and state re-evaluation boolean indicator $r_x'$ for the current region x. |
| 1: | Let $\lambda_1, \lambda_2, \lambda_3, \lambda_4 \in [0,1]$ be user-defined ascending spatio-temporal complexity levels, e.g., $0 < \lambda_1 < \lambda_2 < \lambda_3 < \lambda_4 < 1$. |
| 2: | Let $\lambda_{stc} = \max_{u_{c,d,i} \in U_{c,d,x}} p_{c,s',U}$ be the measure of the spatio-temporal complexity for region x. |
| 3: | Let $\delta_e > 1$ be the exponential increase of the multiplier $m_x$. |
| 4: | Let $\delta_m$ be the linear increment/decrement of the multiplier $m_x$. |
| 5: | (3) |

$$m_x' \leftarrow \begin{cases} \delta_e m_x & \text{if } \lambda_{stc} < \lambda_1 \\ m_x + \delta m & \text{if } \lambda_1 < \lambda_{stc} < \lambda_2 \\ m_x & \text{if } \lambda_2 < \lambda_{stc} < \lambda_3 \\ m_x - \delta m & \text{if } \lambda_3 < \lambda_{stc} < \lambda_4 \\ m_x/2 & \text{if } \lambda_4 < \lambda_{stc} \text{ and } r_x \text{ is false} \\ 1 & \text{otherwise} \end{cases}$$

TABLE 2-continued

Algorithm 2 for computing scaling factors for control action primitives

Figure 6:
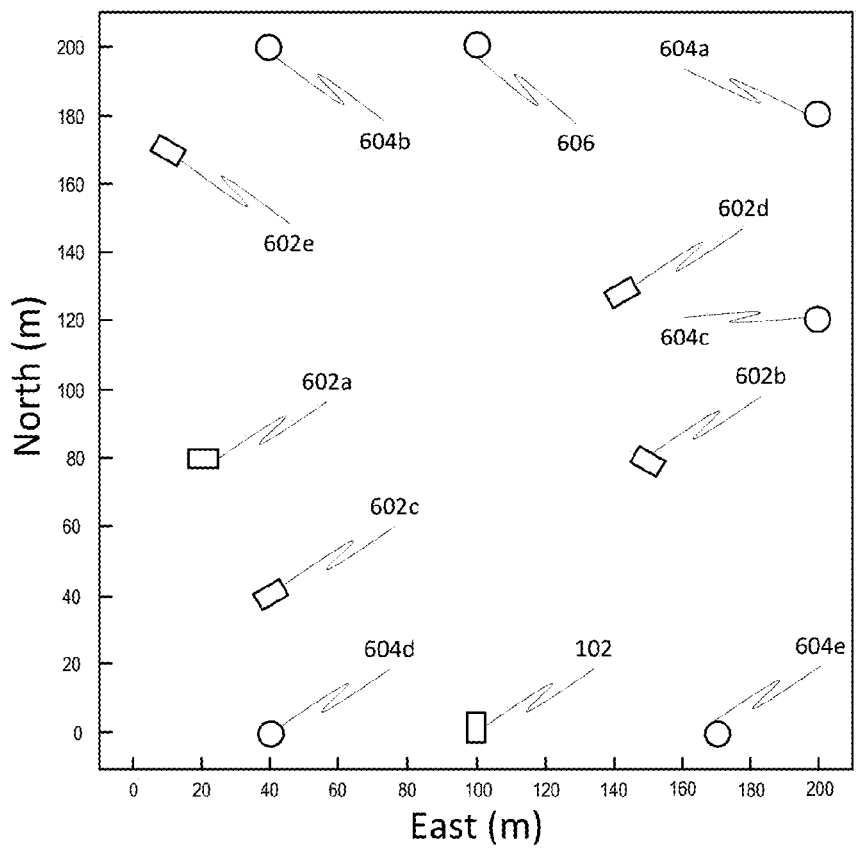
FIG. 6 illustrates an arrangement of obstacles and trajectory goals for a simulation scenario of a trajectory planning method, according to one or more embodiments of the disclosed subject matter.

6:      $m_x' \leftarrow \min(m_x', m_{x,max})$, where $m_{x,max}$ is a user-specified scaling factor threshold.
7:      $m_x' \leftarrow \max(m_x', 1)$.
8:      $r_x' \leftarrow \lambda_{stc} > \lambda_4$.
9:      return $\{m_x', r_x'\}$ As an example, planning algorithms were evaluated using the simulation setup shown in FIG. 6. The area (e.g., travel space) of the simulation setup was 200 m×200 m and included a USV 102 with corresponding goal location 606 and five moving obstacles 602a-602e (e.g., civilian vessels), each with respective goal locations 604a-604e. The initial velocity of the moving obstacles 602a-602e was chosen as 0.42 m/s, 0.92 m/s, 1.3 m/s, 1.3 m/s, and 2.3 m/s, respectively. The motion of the USV 102 was simulated using a system-identified 3 DOF dynamic model, while each moving obstacle 602a-602e was modeled using a simple car kinematic model with the Ackermann steering geometry.

Figure 7A:
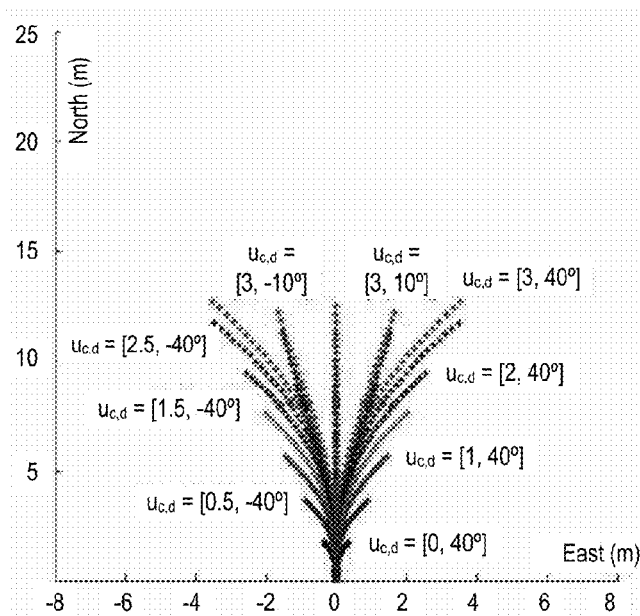
FIGS. 7A-7B are graphs illustrating, respectively, a set $(u_{c,d})$ of control action primitives for a surface vehicle and a set $(u_{e,d})$ of contingency control action primitives for the surface vehicle at different initial surge speeds.
Figure 7B:
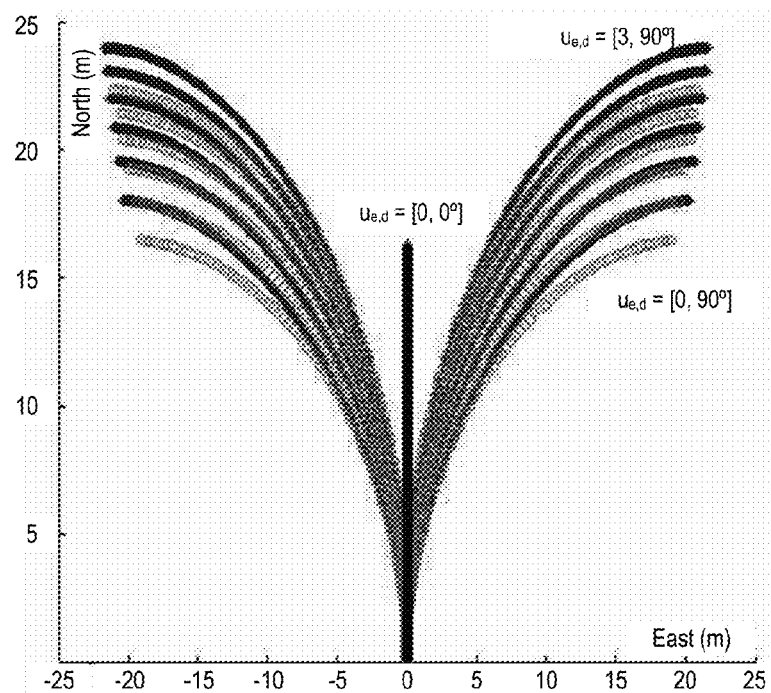

The default control action primitive set $u_{c,d}$ included $\psi_d=0°$, $\pm 10°$, $\pm 40$ and $u_d$ ranging from 0 to 3 m/s in steps of 0.5 m/s, as shown schematically in FIG. 7A. This resulted in a total of 30 default control action primitives including 5 levels of $\psi_d$ and 6 levels of $u_d$. The contingency actions were designed by considering the most common reaction exhibited by humans on a collision course. The contingency actions are illustrated schematically in FIG. 7B. The planner of the USV 102 is designed to select a contingency maneuver with the maximum $d_{CPA}$ with respect to all moving obstacles to maximize safety.

For the experiments, the values of constants used by the cost function for trajectory planning were selected as:
$d_{max}=200$ (e.g., twice a length of a straight path between $s_{U,I}$ and $s_{U,G}$);
$t_{max}=d_{max}/1.5$ (e.g., the average speed of 1.5 m/s);
$\omega_n=1000$;
$\omega_c=0.5$;
$c_{\neg COLREGS}=1000$;
$c_e=500$;
$c_{e,c}=10000$;
$\gamma=0.1$;
$\omega_{c,U,B}=0.3$; and
$\in=4$.
The threshold values for CPA parameters used to evaluate USV's states for COLREGS compliance were selected as $d_{CPA,min}=50$ and $t_{CPA,max}=30$ s.

The obstacle avoidance behavior of the moving obstacles 602a-602e is realized through a Velocity-Obstacle-based (VO) local obstacle avoidance planner (see FIORINI et al., "Motion Planning in Dynamic Environments Using Velocity Obstacles," *The International Journal of Robotics Research*, 1998, 17(7), which is hereby incorporated by reference). The VO-based planner allows for the forward simulation of motions of the obstacles (e.g., civilian vehicles) with increased realism. The parameters of the VO planner were tuned during physical tests.

During the search for a global trajectory, the USV 102 was placed at each expanded state and the behavior of each obstacle 602a-606e was forward simulated using the VO planner. The VO planner computes the best velocity vector for each obstacle 602a-606e given its pose, speed, and motion goal while ignoring its dynamics. This allows the A-RCAP planner to capture a reciprocal trajectory of the obstacles in response to the trajectory of the USV 102. The time for which the obstacles were forward simulated is equal to the execution time of the USV's control action primitive. The computed velocity vector of each obstacle 602-602e was integrated throughout the forward simulation time of control action to determine its future state.

The simulation assumed that all obstacles maintained their velocity vectors for the entire forward simulation time of each control action, which increases the uncertainty in the actual states of the obstacles while executing their planned trajectories. Moreover, the uncertainty increases with the simulation time as moving obstacles tend to wander away from their predicted or planned trajectories. As discussed above, the uncertainty in the positions of a moving obstacle was modeled using a sequence of 2D Gaussian distributions with the means corresponding to the waypoints of the planned trajectory. The variances of the distributions were estimated by performing a Monte Carlo simulation for each scenario. Variances for discrete time slices of 5 to 100 s were calculated for the simulation scenario and were interpolated by fitting a 2 degree polynomial with the forward simulation time as a variable.

In order to evaluate the performance of the disclosed planners, a metric for measuring congestion of a scenario with respect to a given position of the USV was used. A scenario can be classified as congested, for example, if there are only a few large moving obstacles with a large turning radius and low speed. Alternatively or additionally, a scenario can be classified as congested if there are many small highly maneuverable obstacles moving at high speeds within the same region or travel space. In addition, congestion of a scene also varies depending on how far the obstacles are from the current position of the USV. For example, obstacles that are further away from the USV are considered to contribute less to the congestion of the scenario as compared to obstacles that are closer to the USV.

Figure 8:
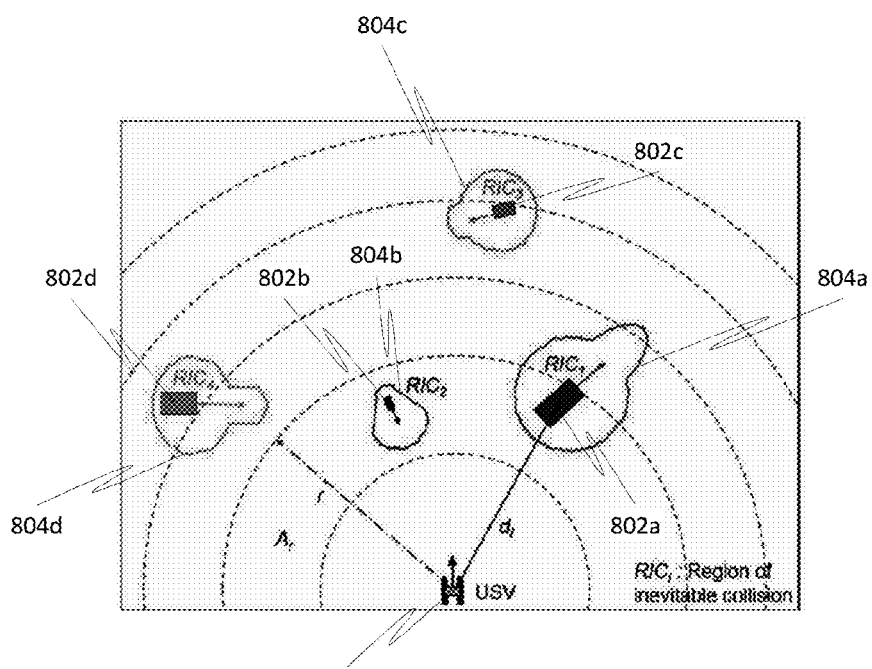
FIG. 8 illustrates aspects of a computation for a congestion metric used in simulation studies of a trajectory planning method, according to one or more embodiments of the disclosed subject matter.

Referring to FIG. 8, the developed metric $\Lambda_{cgn}$ considers the size, velocity, and the distance $d_l$ of each moving obstacle 802a-802d from the USV 102 within a circular area $A_r$ having a radius r with respect to the USV 102. The characteristics of each moving obstacle 802a-802d, such as its size and velocity, are used to compute a respective region of inevitable collision (RIC) 804a-804d with respect to the USV 102 and the moving obstacle $b_l$. For example, the USV is considered to be within $RIC_1$ 804a if there is no control action $u_{c,d} \in u_{c,d}(x_U)$ that would prevent it from colliding with obstacle 802a.

Assuming that the USV 102 moves at its maximum speed when computing $RIC_l$ and defining $RIC_r = \cup_{l=1, d_l < r}^{L} RIC_l$ as the union of all inevitable collision regions of civilian vessels up to the given distance threshold r, then the congestion of the whole scenario can be calculated as $\Lambda_{cgn} = \int_{r=0}^{\infty} RIC_r / A_r dr$. For scenarios with moving obstacles in the vicinity to the USV 102, the degree of congestion $\Lambda_{cgn}$ gradually increases with the increase of the radius r as more vessels fall into $A_r$. Beyond a certain radius, $\Lambda_{cgn}$ gradually decreases as the total area $A_r$ becomes more significant compared to $RIC_r$.

The regions of inevitable collision $RIC_I$ were precomputed for the obstacles with maximum surge speeds between 1 and 5 m/s in increments of 0.1 m/s and lengths between 4 m and 30 m in increments of 1 m. During the computation of $\Lambda_{cgn}$, the radius r of the area $A_r$ was increased from 5 m to 200 m (i.e., the maximum size of the workspace) in increments of 5 m. Note that scenarios with different types of obstacles and their distribution in the area can lead to the same congestion value. For example, the congestion value of 7 corresponds to a scenario with 4 obstacles having respective lengths of 10 m and maximum surge speed of 4 m/s, as well as to a scenario with 8 obstacles having respective lengths of 5 m and maximum surge speeds of 1 m/s.

Ten groups of evaluation scenarios with a similar congestion value ranging from 0 to 50 were designed. For each congestion group, 1000 evaluation scenarios were randomly generated. In each evaluation scenario, the USV 102 was positioned at the same initial state $s_{U,I}=[0,100,0,0,0]^T$ and given a stationary goal state of $s_{U,G}=[200,100]^T$ (neglecting heading and surge speed state variables at the goal state). The simulation runs were performed on Intel® Core™ i7-2600 CPU @ 3.4 GHz machine with 8 GB RAM.

The number of moving obstacles was uniformly generated at random ranging from 3 to 8 obstacles. The poses of the obstacles were also randomly generated, but no obstacles were positioned inside a circle of 20 m radius around the USV 102, which corresponds to a minimum turning radius of this particular USV, in order to avoid an imminent collision at the beginning of an evaluation run. The length of each obstacle was randomly generated to be between 4 and 30 m, and its maximum surge speed was determined to be between 1 and 5 m/s.

Simulation experiments using multiple scenarios with different congestion levels were carried out to evaluate the collision risk, length, and execution time of trajectories computed by the RCAP and A-RCAP algorithms. As noted above, the RCAP algorithm alone is computationally expensive, which leads to a low replanning frequency. To be able to avoid highly dynamic obstacles, a complementary VO-based local planner was used to track a global trajectory computed by the RCAP algorithm. For details of the complementary VO-based local planner, see SVEC et al., "Dynamics-aware Target Following for an Autonomous Surface Vehicle Operating under COLREGS in Civilian Traffic," *Proceedings of the IEEE/RSI International Conference on Intelligent Robots and Systems*, 2013, which is hereby incorporated by reference. In the simulation results presented herein, the global risk and contingency-aware trajectory is computed once by the RCAP at the beginning of a simulation run. The trajectory is then tracked by the VO-based local planner until the USV reaches its goal.

Figure 9:
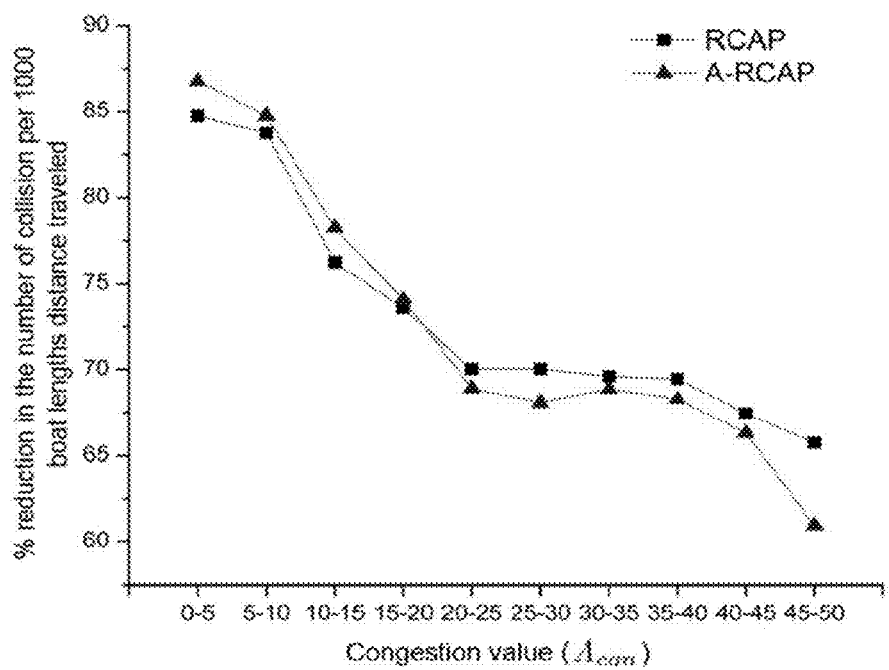
FIG. 9 is a graph of percentage reduction in the number of collisions recorded per 1000 boat lengths traveled by the surface vehicle, as compared to a velocity-obstacle-based planner, versus degree of congestion for different trajectory planning algorithms.

As is evident from FIG. 9, the use of the RCAP algorithm combined with the VO-based local planner results in significantly fewer number of collisions as compared to a state-of-the-art VO-based local planner used in marine missions. For details of the state-of-the-art VO-based local planner, see KUWATA et al., "Safe Maritime Autonomous Navigation with COLREGS, Using Velocity Obstacles," *IEEE Journal of Oceanic Engineering*, 2014, 39(1), which is hereby incorporated by reference. The collision rate represents the percentage reduction in the number of collisions per 1000 boat lengths traveled by the USV 102. Note that the percentage reduction in the number of collisions by the A-RCAP algorithm is approximately the same to its non-adaptive predecessor. Thus, the A-RCAP algorithm can improve computational efficiency without degrading the quality of risk-aware trajectories.

There are several reasons for the reduction in the collision rate. First, the planners consider differential constraints of the USV 102 when computing a trajectory. In the case of RCAP, this allows the complementary VO-based local planner to successfully track the trajectory. Second, the planners minimize the overall collision risk by breaching COLREGS with respect to selected obstacles and choosing a lower risk workspace over a higher risk, obstacle dense workspace. The state-of-the-art VO-based planner, which employs a limited number of look-ahead steps, cannot reason about the collision risk over a larger portion of the workspace. Accordingly, breaching COLREGS for the state-of-the-art VO-based planner may prove disastrous in later stages. By incorporating contingency maneuvers into a global trajectory, as with the RCAP and A-RCAP algorithms, the USV 102 can be assured of at least one contingency maneuver to avoid an imminent collision due to unpredictable behaviors of moving obstacles.

Figure 10:
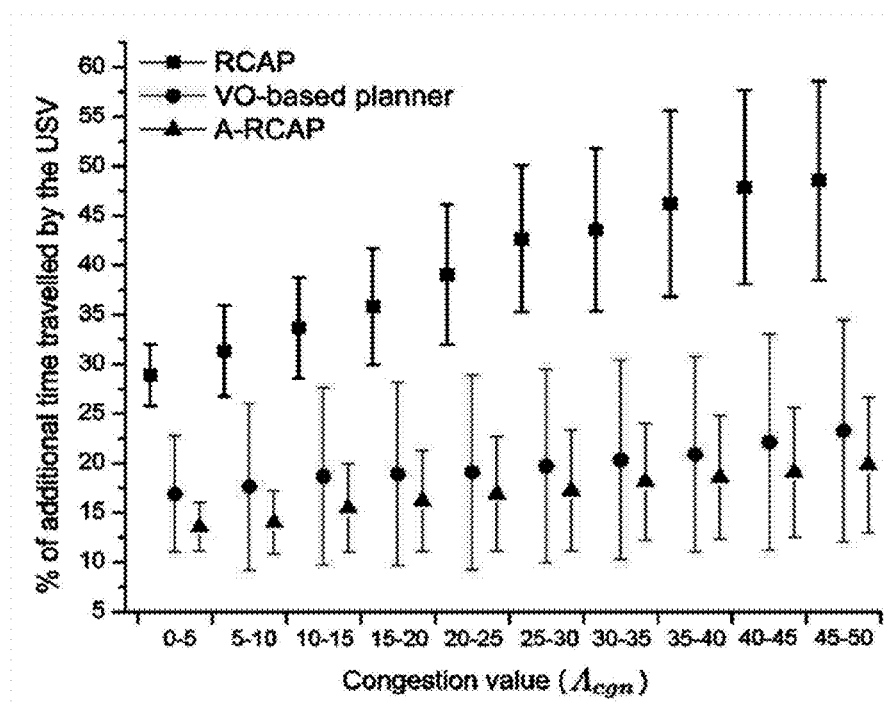
FIG. 10 is a graph of percentage additional time traveled by the surface vehicle as compared to a zero-congestion scenario versus degree of congestion for different trajectory planning algorithms.
Figure 11:
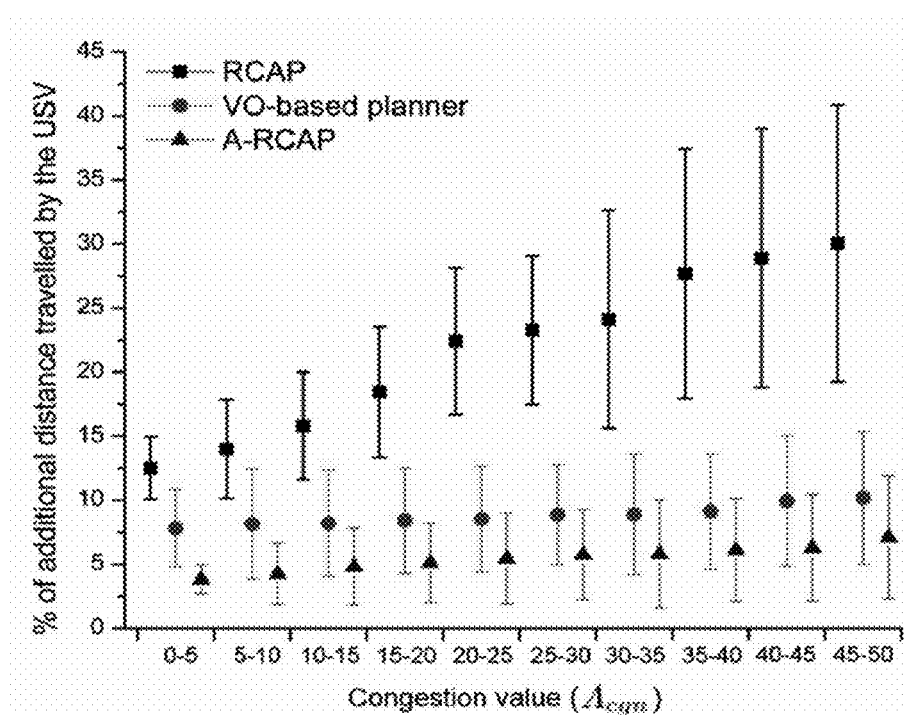
FIG. 11 is a graph of percentage additional distance traveled by the surface vehicle as compared to a zero-congestion scenario versus degree of congestion for different trajectory planning algorithms.

Referring to FIGS. 10-11, simulation results are shown for the percentage of additional time and distance traveled by the USV 102 for trajectories determined by the state-of-the-art VO-based planner, the RCAP, and the A-RCAP as compared to the time and distance for the same scene with zero congestion. The distance traveled in a scene with zero congestion is equivalent to the Euclidean distance from the initial to the goal state. The travel time in this zero congestion scenario is equivalent to the time required by the USV 102 to travel from the initial to the goal state at the maximum surge speed of 3 m/s.

As is apparent from FIGS. 10-11, the travel time and traveled distance is greater than the zero congestion scenario for all the planners, but the amount of additional travel time does not directly correlate to the additional traveled distance. This is due to the fact that the USV 102 yields to several moving obstacles by slowing down rather than performing large avoidance maneuvers, which decreases the distance traveled while increasing the time.

In addition, the additional traveled distance and time significantly increase for the RCAP with the increase in congestion as compared to the state-of-the-art VO-based and A-RCAP planners. Due to the lack of replanning capability of global, risk-aware trajectories by the RCAP, the complementary local VO-based planner used in conjunction with the RCAP has to perform large avoidance maneuvers to handle the dynamics of the environment while simultaneously tracking a global trajectory. In other words, the USV 102 has to return to the global trajectory after performing a local avoidance maneuver, which results in larger travel distance and time. In contrast, the replanning rate of the state-of-the-art local VO-based planner is high, thereby allowing it to deal with the highly dynamic nature of the environment and to find shorter and faster paths as compared to RCAP, albeit at the cost of higher collision rates.

Table 3 compares the performance of RCAP and A-RCAP for different congestion values. Table 3 show approximately 500% improvement in the computational performance of the A-RCAP as compared to the non-adaptive RCAP, where computational performance is measured in terms of the number of states expanded during the search for a trajectory. Such improved computational/processing speeds can allow the USV 102 to replan its trajectory with an average frequency of 0.1 Hz per 7.5 boat lengths of traveled distance. This frequent replanning of global risk and contingency-aware trajectories results in minimizing, or at least significantly reducing, the USV's total travel distance and time to reach its goal. In particular, A-RCAP shows approximately 20% reduction in the travel distance and 25% reduction in the travel time as compared to RCAP.

TABLE 3

Average number of states expanded by RCAP and A-RCAP algorithms

| Congestion Value | RCAP | | A-RCAP | |
|---|---|---|---|---|
| ($\Lambda_{cgn}$) | Mean | Std. Dev. | Mean | Std. Dev. |
| 0-5 | 940.54 | 55.41 | 188.92 | 12.65 |
| 5-10 | 1006.78 | 62.58 | 195.7 | 13.86 |
| 10-15 | 1055.48 | 68.14 | 203.21 | 16.9 |
| 15-20 | 1155.82 | 75.37 | 215.87 | 16.8 |
| 20-25 | 1213.86 | 84.24 | 220.55 | 17.01 |
| 25-30 | 1266.29 | 91.43 | 221.24 | 17.56 |
| 30-35 | 1320.78 | 90.89 | 229.61 | 18.08 |
| 35-40 | 1388.35 | 98.54 | 237.23 | 18.73 |
| 40-45 | 1480.22 | 110.19 | 249.1 | 18.6 |
| 45-50 | 1575.18 | 118.72 | 257.96 | 18.9 |

While the replanning frequency of the A-RCAP may be smaller than the replanning frequency of the state-of-the-art VO-based planner, such a VO-based planner does not minimize the global objective of the total traversal time and distance. Also, the state-of-the-art VO-based planner does not have multi-step look-ahead capability to predict the motion of other civilian vessels, which also results in longer travel times and distance.

In one or more embodiments of the disclosed subject matter, the A-RCAP planner can be configured to accept user input, for example, via a graphic user interface, communications port, etc., with respect to one or more parameters or variables. Alternatively or additionally, one or more parameters of the A-RCAP planner can be tuned prior to trajectory planning (e.g., at launch of USV on a particular mission or upon introduction of the USV into a particular travel space) for optimum, or at least improved performed. For example, user preference parameters, COLREGS parameters, planning speed parameters, and/or replanning frequency parameters, as discussed in further detail below, can be input to the A-RCAP planner by a user, or otherwise, prior to trajectory planning.

Planning parameter tuning can include general categories of user preference parameters, COLREGS parameters, and planning speed parameters, among others. User preference parameters are parameters that alter trajectories generated by the planner according to the preference of the user. Parameters falling within the scope of this category include, but are not limited to:

$\omega_c$: The parameter $\omega_c \in [0,1]$ is used to balance the total travel time and distance of the computed trajectory. A value of $\omega_c = 0$ will provide trajectories with short travel distance and long travel time (in other words, the USV will travel less distance at slower speed). In contrast, a value of $\omega_c = 1$ will provide the opposite effect. Thus, $\omega_c$ helps a user to capture the USV's mission objective in terms of total travel time and distance.

$\omega_n$: The parameter $\omega_n \in [0,1]$ balances the USV's mission objective (i.e., total travel time and distance) against its compliance with COLREGS. The planner will provide the safest COLREGS-compliant trajectory with no constraint on travel time and distance at lower values of $\omega_n$. For example, at $\omega_n = 0$, the planner may provide a trajectory solution that has the USV remain at its current position until a moving obstacle has cleared from the environment. However, at $\omega_n = 1$, the planner will compute trajectories that are optimal in travel time and distance ($\omega_c$) and disregard the rules of the COLREGS. Thus, a user can tune this parameter, depending upon the assigned mission for the USV, to balance COLREGS-compliance and mission objectives.

$\omega_{c,U,B}$: The parameter $\omega_{c,U,B} \in [0,1]$ balances collision risk of the USV with the moving obstacles versus collision risk among the moving obstacles themselves. At values below 0.5, the planner will prioritize collisions of the USV over collisions between the moving obstacles. The opposite prioritization will occur for values above 0.5.

$t_{max}$ and $d_{max}$: These parameters are dependent on the mission objectives of the USV, where $t_{max}$ specifies the maximum allotted time and $d_{max}$ specifies the maximum allocated distance that the USV can travel in the currently assigned mission.

Initially, a user can set default parameter values and evaluate the trajectory produced by the planner, for example, on three fronts: travel time, travel distance, and risk of breaching COLREGS. The user can then tweak these parameters ($\omega_c$, $\omega_n$, $\omega_{c,U,B}$) to improve the quality of the trajectory on each front and/or until the computed trajectory meets the desired quality.

COLREGS parameters are used to perform COLREGS-based obstacle avoidance. They may be tuned by experts with knowledge of the physical capabilities of the USV, for example, by a manufacturer of the USV, maritime navigation experts, and/or Coast Guard officials. Parameters that fall in this category are divided into two subgroups:

$d_{CPA,min}$ and $t_{CPA,max}$: These parameters are distance and time to closest point of approach and are used for collision detection. The USV will perform large and conservative avoidance maneuvers with high values of $d_{CPA,min}$ and $t_{CPA,max}$. In contrast, for lower values of $\$d_{CPA,min}$ and $t_{CPA,max}$, the USV will perform short and risky avoidance maneuvers.

Cost parameters: These parameters include the execution cost of an emergency control action ($c_e$), the collision cost of the emergency control action ($c_{e,c}$), and the penalty for breaching COLREGS ($c_{\neg COLREGS}$), and are used to model risk of the computed trajectory.

The above-noted COLREGS parameters can be tuned in two phases, for example. First, default values of the planner can be selected by interviewing experts about standard practices and avoidance strategies given the specifications for the USV and the type of the travel space/environment that the USV will encounter. The user can use these default values in the planner and generate sample trajectories. Second, the generated sample trajectories can be critiqued by the expert in a Learning from Critique (LfC) framework. Depending upon the information provided by the expert, the user can tweak the parameter set and generate a new trajectory. This procedure can be iteratively performed until the planner provides trajectories that meet the satisfactory limits of the expert.

Planning set parameters are used to improve the computational performance of the algorithms. Since the RCAP is inherently limited in terms of computational speed as compared to the A-RCAP planner, these parameters are primarily used by A-RCAP. Indeed, many unmanned systems (including the USVs disclosed herein) have finite on-board computational resources. Should the on-board trajectory planner require longer computational times to produce optimal trajectories, such delayed response may prove to be disastrous in a dynamic and rapidly changing environment having high congestion. On the other hand, trajectories computed by the planner using a computational time that is too short may be sub-optimal. Thus, given the on-board computational resources and the congestion of the environment, the user can choose a balanced set of parameters that will enable the planner to compute optimal trajectories with minimal delay.

These planning speed parameters include spatio-temporal complexity levels ($\lambda_1$, $\lambda_2$, $\lambda_3$, $\lambda_4$), exponential scaling factor ($\delta_e$), and linear scaling factor ($\delta_l$), which are used for adaptively scaling the control primitives in A-RCAP. These parameters can be optimized, for example, by performing combinatorial search over the entire parameter set [$\lambda_1$, $\lambda_2$, $\lambda_3$, $\lambda_4$, $\delta_e$, $\delta_l$]. Alternatively, to reduce computational overhead, partitioned optimization can be performed, where the parameter set is divided into spatio-temporal complexity parameters [$\lambda_1$, $\lambda_2$, $\lambda_3$, $\lambda_4$], and scaling factors [$\delta_e$, $\delta_l$], as described below.

The values of spatio-temporal complexity $\lambda_1$, $\lambda_2$, $\lambda_3$, $\lambda_4$ significantly influence the collision rate, and thus the overall performance of the A-RCAP algorithm. The parameters are optimized by performing combinatorial search over 15 different combinations of [$\lambda_1$, $\lambda_2$, $\lambda_3$, $\lambda_4$] to achieve the smallest collision rate. The parameters in each combination follow a precedence order $0<\lambda_1<\lambda_2<\lambda_3<\lambda_4<1$. Each combination was evaluated using 1000 randomly generated test cases for three congestion groups with congestion values $\Lambda_{cgn}$=10-15, 25-30, and 40-45. For optimization of the spatio-temporal complexity parameters, the values of the exponential ($\delta_e$) and linear ($\delta_l$) scaling factors were randomly sampled. The parameters set $\Lambda^*_{stc}$={0.25, 0.4, 0.55, 0.7} resulted in minimum collision rates for all the three congestion groups.

The values for scaling factors of control action primitives ($\delta_e$ and $\delta_l$) influences the computational performance, the total travel time, and the total travel distance by the USV. The parameters were optimized by performing combinatorial search over the range of discrete values of $\delta_e$ and $\delta_l$. Table 4 below shows the number of states expanded with respect to $\delta_e$ and $\delta_l$ at constant optimum value of the spatio-temporal complexity levels $\Lambda^*_{stc}$. At higher values of $\delta_e$ and $\delta_l$, the number of states expanded reduces, and the planner rapidly increases the time scaling of the control action primitives resulting in an improvement in the computational performance. However, this improvement in the computation performance of the planner comes at the cost of an increase in total travel distance by the USV. This behavior of the planner is demonstrated in Table 5 below, where the percentage additional distance traveled by the USV is evaluated with respect to discrete values of $\delta_e$ and $\delta_l$.

TABLE 4

Mean number of states expanded by varying the exponential and linear increment parameters for different congestion value scenarios

| Exponential increment ($\delta_e$) | Linear increment ($\delta_l$) | Mean number of states expanded | | |
|---|---|---|---|---|
| | | Congestion 10-15 | Congestion 25-30 | Congestion 40-45 |
| 1.4 | 0.1 | 318.36 | 235.84 | 365.15 |
| | 0.4 | 224.83 | 206.76 | 328.63 |
| | 0.7 | 218.3 | 198.23 | 284.2 |
| | 1 | 212.83 | 196.89 | 243.11 |
| 1.6 | 0.1 | 241.02 | 229.95 | 269.8 |
| | 0.4 | 214.87 | 196.73 | 260.42 |
| | 0.7 | 213.96 | 198.28 | 233.88 |
| | 1 | 204.51 | 192.52 | 241.34 |

TABLE 4-continued

Mean number of states expanded by varying the exponential and linear increment parameters for different congestion value scenarios

| Exponential increment ($\delta_e$) | Linear increment ($\delta_l$) | Mean number of states expanded | | |
|---|---|---|---|---|
| | | Congestion 10-15 | Congestion 25-30 | Congestion 40-45 |
| 1.8 | 0.1 | 216.62 | 221.6 | 261.12 |
| | 0.4 | 215.98 | 226.44 | 230.48 |
| | 0.7 | 188.32 | 203.78 | 243.72 |
| | 1 | 176.88 | 188.78 | 218.78 |
| 2 | 0.1 | 152.27 | 196.45 | 262.46 |
| | 0.4 | 142.34 | 184.24 | 181.84 |
| | 0.7 | 146.86 | 173.63 | 176.15 |
| | 1 | 144.73 | 165.69 | 175.41 |

TABLE 5

Mean of percentage additional distance traveled by varying the linear and exponential increment parameters for different congestion value scenarios

| Exponential increment ($\delta_e$) | Linear increment ($\delta_l$) | Mean % of additional travel distance | | |
|---|---|---|---|---|
| | | Congestion 10-15 | Congestion 25-30 | Congestion 40-45 |
| 1.4 | 0.1 | 0.59 | 1.235 | 2.07 |
| | 0.4 | 1.38 | 1.955 | 2.177 |
| | 0.7 | 0.56 | 0.375 | 5.17 |
| | 1 | 0.49 | 1.98 | 5.025 |
| 1.6 | 0.1 | 0.435 | 2.13 | 2.87 |
| | 0.4 | 1.25 | 1.715 | 4.36 |
| | 0.7 | 3.395 | 1.22 | 5.42 |
| | 1 | 1.975 | 2.385 | 6.325 |
| 1.8 | 0.1 | 0.75 | 1.365 | 2.99 |
| | 0.4 | 1.755 | 1.75 | 4.94 |
| | 0.7 | 3.68 | 2.6 | 5.76 |
| | 1 | 2.14 | 3.93 | 6.445 |
| 2 | 0.1 | 0.415 | 2.745 | 3.145 |
| | 0.4 | 2.38 | 2.61 | 5.575 |
| | 0.7 | 4.745 | 3.74 | 6.405 |
| | 1 | 5.655 | 4.81 | 7.46 |

Selection of the appropriate values for $\delta_e$ and $\delta_l$ can provide the shortest travel distance in the fewest expanded states. However, unlike, spatio-temporal complexity parameters, it can be difficult to select a single optimum value for each of $\delta_e$ and $\delta_l$ that will work for every scenario and congestion value. For the scenarios with high congestion values (e.g., $\Lambda_{cgn}$=40-45), the environment has a higher number of moving obstacles and thus less free space. For these high congestion values, it may be beneficial to select lower values of $\delta_e$ and $\delta_l$ in order to gradually scale the control action primitives. For example, in scenarios with high congestion values, low values of $\delta_e$ and $\delta_l$ (e.g., $\delta_e$=1.4 and $\delta_l$=0.1) can be selected in order to provide shorter travel distances. For scenarios with low congestion values (e.g., $\delta_{cgn}$=10-15), the control primitives can be scaled more rapidly, such that higher values of $\delta_e$ and $\delta_l$ (e.g., $\delta_e$=2 and $\delta_l$=0.1) can be selected. These higher values provide, for example, 0.415% of additional travel distance.

In addition to those parameters discussed above, the planner of USV can also employ one or more finite time variables in order to avoid static and/or dynamic obstacles in the environment. Such time variables can include, but are not limited to:

$t_{perception}$: Time taken by the perception system (e.g., perception module 206 in FIG. 2) to identify and estimate the state of an obstacle in the given environment;

$t_{planning}$: Computational time required by the planner to compute avoidance strategies after getting state information from the perception system;

$t_{reaction}$: Finite reaction time required by the USV to start executing commands issued by a high level planner (e.g., planning module 210 in FIG. 2); and $t_{execution}$: Time required by the USV to execute an emergency control action to avoid collision.

The planning frequency for collision free operation of the USV in an environment with a given congestion value is governed by the time equation $t_{CPA} > (t_{perception} + t_{reaction} + t_{execution} + t_{planning})$. The planning time can be further divided into the computation time required by the deliberative planner A-RCAP ($t_{deliberative}$) and the computational time required by the complementary VO-based reactive planner ($t_{reactive}$), i.e., $t_{planning} = t_{deliberative} + t_{reactive}$. The computation time for the deliberative planner is higher than that of the reactive planner (i.e., $t_{deliberative} > t_{reactive}$). Thus, the planning cycle for the reactive planner is significantly smaller than that of the deliberative planner. The deliberative planner provides the global path by considering the current state of the travel space. However, until the next planning cycle of deliberative planner, the reactive planner can be used to perform avoidance maneuvers if the USV comes across any unpredicted situation, similar to the configuration of the RCAP and complementary VO-based planner in the simulation discussion above.

For example, the computation time for the reactive planner can be approximately $t_{reactive} = 300$ ms, while the average planning time for the deliberative planer (A-RCAP) can be approximately $t_{deliberative} = 10$ s. Approximate values of the reaction time $t_{reaction} = 1$ s and the execution time $t_{execution} = 10$ s are computed using the system identified dynamics model of the USV. The execution time $t_{execution}$ is equal to the maximum of all the execution time taken by the USV to execute contingency control action primitives. The value of time to CPA used by the A-RCAP planner to perform the avoidance maneuver can be set to $t_{CPA,max} = 30$ s, which can be determined from physical experiment, for example. The time taken by the perception system can be approximately $t_{perception} = 1$ s, for example. Thus, the deliberative planner (A-RCAP) can successfully yield to all the civilian vessels having time to CPA above $t_{CPA} > 30$ s.

The value of $t_{CPA,max}$ will depend upon the relative velocity of the USV and the moving obstacles in the current travel space. If the USV has to operate in travel spaces with high-speed obstacles, thereby requiring lower values of $t_{CPA,max}$, then improved computational performance may be necessary. Such improved computational performance may be achieved by use of better hardware (e.g., faster processors) and/or parallelization, among other things.

Accordingly, embodiments of the disclosed subject matter can employ a lattice-based, 5D trajectory planner that: 1) estimates the collision risk of a trajectory and reasons about the availability of contingency maneuvers to counteract unpredictable behaviors of moving obstacles; 2) incorporates the avoidance behaviors of the moving obstacles into the search to minimize collision risk; 3) considers the USV's dynamics; and/or 4) dynamically scales control action primitives based on the congestion of state space regions to maximize search performance. Embodiments of the disclosed subject matter can thus enjoy enhanced computational performance, allowing for more frequent replanning, as well as define improved trajectories with a reduced overall collision rate.

Although specific examples have been described herein where the moving obstacles are civilian vehicles, embodiments of the disclosed subject matter are not limited to such examples. Rather, other types of moving obstacles, such as other unmanned autonomous surface vehicles or military vehicles, are also possible according to one or more contemplated embodiments.

In addition, although specific examples have been described herein where the planning module is part of an operating system for a USV, embodiments of the disclosed subject matter are not limited to such examples. Indeed, the planning module disclosed herein may find utility in other systems as well, for example, in an automatic cruising feature of a manned surface vehicle, a traffic control system for managing vehicular traffic in a travel space (such commercial boats in a port), or a vehicle navigation system that suggests optimal routes to a vehicle operator. Accordingly, the disclosed planning module may be used outside of a USV according to one or more contemplated embodiments.

It will be appreciated that the aspects of the disclosed subject matter can be implemented, fully or partially, in hardware, hardware programmed by software, software instruction stored on a computer readable medium (e.g., a non-transitory computer readable medium), or any combination of the above.

For example, components of the disclosed subject matter, including components such as a controller, process, or any other feature, can include, but are not limited to, a personal computer or workstation or other such computing system that includes a processor, microprocessor, microcontroller device, or is comprised of control logic including integrated circuits such as, for example, an application specific integrated circuit (ASIC).

Features discussed herein can be performed on a single or distributed processor (single and/or multi-core), by components distributed across multiple computers or systems, or by components co-located in a single processor or system. For example, aspects of the disclosed subject matter can be implemented via a programmed general purpose computer, an integrated circuit device, (e.g., ASIC), a digital signal processor (DSP), an electronic device programmed with microcode (e.g., a microprocessor or microcontroller), a hard-wired electronic or logic circuit, a programmable logic circuit (e.g., programmable logic device (PLD), programmable logic array (PLA), field-programmable gate array (FPGA), programmable array logic (PAL)), software stored on a computer-readable medium or signal, an optical computing device, a networked system of electronic and/or optical devices, a special purpose computing device, a semiconductor chip, a software module or object stored on a computer-readable medium or signal.

When implemented in software, functions may be stored on or transmitted over as one or more instructions or code on a computer-readable medium. The steps of a method or algorithm disclosed herein may be embodied in a processor-executable software module, which may reside on a computer-readable medium. Instructions can be compiled from source code instructions provided in accordance with a programming language. The sequence of programmed instructions and data associated therewith can be stored in a computer-readable medium (e.g., a non-transitory computer readable medium), such as a computer memory or storage device, which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

As used herein, computer-readable media includes both computer storage media and communication media, including any medium that facilitates transfer of a computer program from one place to another. Thus, a storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a transmission medium (e.g., coaxial cable, fiber optic cable, twisted pair, digital subscriber line (DSL), or wireless technologies such as infrared, radio, and microwave), then the transmission medium is included in the definition of computer-readable medium. Moreover, the operations of a method or algorithm may reside as one of (or any combination of) or a set of codes and/or instructions on a machine readable medium and/or computer-readable medium, which may be incorporated into a computer program product.

One of ordinary skill in the art will readily appreciate that the above description is not exhaustive, and that aspects of the disclosed subject matter may be implemented other than as specifically disclosed above. Indeed, embodiments of the disclosed subject matter can be implemented in hardware and/or software using any known or later developed systems, structures, devices, and/or software by those of ordinary skill in the applicable art from the functional description provided herein.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

The foregoing descriptions apply, in some cases, to examples generated in a laboratory, but these examples can be extended to production techniques. Thus, where quantities and techniques apply to the laboratory examples, they should not be understood as limiting.

It is thus apparent that there is provided in accordance with the present disclosure, surface vehicle trajectory planning systems, devices, and methods. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A system for controlling a surface vehicle, comprising:
a computerized operating system including a planning module configured to determine a trajectory for the surface vehicle that avoids one or more moving obstacles by performing a lattice-based heuristic search of a state space for the surface vehicle and selecting control action primitives from a predetermined set of control action primitives for the surface vehicle based on the search,
wherein the planning module separates a travel space for the surface vehicle into a plurality of regions and independently scales the control action primitives in each region based on the moving obstacles therein,
wherein the heuristic search includes evaluating a cost function at each state of the state space, and
wherein the cost function is based on at least predicted movement of the obstacles responsive to respective maneuvers performed by the surface vehicle at each node of said search.

2. The system of claim 1, wherein the planning module is configured to set a multiplier value associated with the control action primitives in a first of the plurality of regions different from a multiplier value associated with the control action primitives in a second of the plurality of regions, the first region having a different level of congestion for the moving obstacles than that of the second region.

3. The system of claim 1, wherein the scaling of the control action primitives is such that sampling in regions with higher levels of congestion of the moving obstacles is increased as compared to sampling in regions with lower levels of congestion of the moving obstacles.

4. The system of claim 1, wherein the computerized operating system comprises:
a perception module configured to output to the planning module a current state of the surface vehicle and states of the moving obstacles; and
a control module configured to receive the determined trajectory from the planning module and to control the surface vehicle so as to follow the determined trajectory.

5. The system of claim 1, wherein each control action primitive comprises at least a pose of the surface vehicle and an arrival time or velocity for the surface vehicle.

6. The system of claim 1, wherein the cost function is further based on at least one of collision risk of the surface vehicle with the moving obstacles, availability of contingency maneuvers for the surface vehicle to avoid colliding with the moving obstacles, and compliance with predetermined navigation rules governing movement of the obstacles and the surface vehicle.

7. The system of claim 1, wherein the cost function is given by $f(s')=g(s')+\in h(s')$, where $g(s')$ is cost-to-come, $h(s')$ is cost-to-go, and $\in$ is a parameter for balancing a computational speed of the search and optimality of the trajectory.

8. The system of claim 1, wherein the planning module is configured to repeat the determining as the surface vehicle and the obstacles move.

9. The system of claim 1, wherein the state space is a five dimensional state space including time, position, orientation, and surge speed.

10. A non-transitory computer-readable storage medium upon which is embodied a sequence of programmed instructions that cause a computer processing system of a surface vehicle to:
separate a travel space for the surface vehicle into a plurality of regions;
independently scale control action primitives in each of said regions based on moving obstacles therein;

perform a lattice-based heuristic search of a state space for the surface vehicle in each of said regions;

based on the heuristic search, select a particular control action primitive from a predetermined set of control action primitives, and iterate the performing and selecting so as to build a determined trajectory for the surface vehicle by concatenating the selected control action primitives, wherein the heuristic search includes evaluating a cost function at each state of the state space, and wherein the cost function is based on at least predicted movement of the obstacles responsive to respective maneuvers performed by the surface vehicle at each iteration of the search.

11. The non-transitory computer-readable storage medium of claim 10, wherein the independently scaling the control action primitives comprises setting a multiplier value associated with the control action primitives in a first of the plurality of regions different from a multiplier value associated with the control action primitives in a second of the plurality of regions, the first region having a different level of congestion for the moving obstacles than that of the second region.

12. The non-transitory computer-readable storage medium of claim 10, wherein the sequence of programmed instructions further cause the computer processing system to control the surface vehicle to follow the determined trajectory.

13. The non-transitory computer-readable storage medium of claim 10, wherein the cost function is further based on at least one of collision risk of the surface vehicle with the moving obstacles, availability of contingency maneuvers for the surface vehicle to avoid colliding with the moving obstacles, and compliance with predetermined navigation rules governing movement of the obstacles and the surface vehicle.

14. The non-transitory computer-readable storage medium of claim 10, wherein
each control action primitive comprises at least a pose of the surface vehicle and an arrival time or velocity for the surface vehicle, and
the state space is a five dimensional state space including time, position, orientation, and surge speed.

15. The non-transitory computer-readable storage medium of claim 10, wherein the cost function is given by $f(s')=g(s')+\in h(s')$, where $g(s')$ is cost-to-come, $h(s')$ is cost-to-go, and $\in$ is a parameter for balancing a computational speed of the search and optimality of the trajectory.

16. A surface vehicle comprising:
at least one actuator for propelling or directing the surface vehicle through a travel space; and
a planning module that determines a trajectory for the surface vehicle that avoids one or more moving obstacles in the travel space,
wherein the planning module performs a lattice-based heuristic search of a state space for the surface vehicle and selects control action primitives from a predetermined set of control action primitives based on the search,
wherein the planning module separates the travel space into a plurality of regions and independently scales the control action primitives in each region based on the moving obstacles therein,
wherein the heuristic search includes evaluating a cost function at each state of the state space, and
wherein the cost function is based on at least predicted movement of the obstacles responsive to the selected control action at each node of the search.

17. The surface vehicle of claim 16, wherein the surface vehicle is constructed to operate as an unmanned autonomous vehicle traveling on a water surface.

18. The surface vehicle of claim 16, wherein the scaling of the control action primitives is such that sampling in regions with higher levels of congestion of the moving obstacles is increased as compared to sampling in regions with lower levels of congestion of the moving obstacles.

19. The surface vehicle of claim 16, further comprising:
at least one sensor that monitors the surface vehicle and/or the moving obstacles;
a perception module that outputs to the planning module a current state of the surface vehicle and/or states of the moving obstacles based on outputs from the at least one sensor; and
a control module that receives the determined trajectory from the planning module and controls the at least one actuator such that the surface vehicle follows the determined trajectory.

20. The surface vehicle of claim 16, wherein the cost function is further based on at least one of collision risk of the surface vehicle with the moving obstacles, availability of contingency maneuvers for the surface vehicle to avoid colliding with the moving obstacles, and compliance with predetermined navigation rules governing movement of the obstacles and the surface vehicle.

* * * * *